United States Patent
Hashimoto et al.

(10) Patent No.: US 10,662,819 B2
(45) Date of Patent: May 26, 2020

(54) EXHAUST CHAMBER INLET-SIDE MEMBER, EXHAUST CHAMBER, GAS TURBINE, AND LAST-STAGE TURBINE BLADE REMOVAL METHOD

(71) Applicant: MITSUBISHI HITACHI POWER SYSTEMS, LTD., Kanagawa (JP)

(72) Inventors: Takuro Hashimoto, Kanagawa (JP); Kunihiko Waki, Kanagawa (JP); Shinya Hashimoto, Kanagawa (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 653 days.

(21) Appl. No.: 15/118,706

(22) PCT Filed: Feb. 3, 2015

(86) PCT No.: PCT/JP2015/053007
§ 371 (c)(1),
(2) Date: Aug. 12, 2016

(87) PCT Pub. No.: WO2015/137010
PCT Pub. Date: Sep. 17, 2015

(65) Prior Publication Data
US 2017/0067369 A1 Mar. 9, 2017

(30) Foreign Application Priority Data

Mar. 14, 2014 (JP) .................... 2014-052157

(51) Int. Cl.
*F01D 25/30* (2006.01)
*F01D 25/16* (2006.01)
(Continued)

(52) U.S. Cl.
CPC ............. *F01D 25/30* (2013.01); *F01D 5/02* (2013.01); *F01D 5/12* (2013.01); *F01D 9/02* (2013.01);
(Continued)

(58) Field of Classification Search
CPC ... F01D 25/30; F01D 5/02; F01D 5/12; F01D 9/02; F01D 9/041; F01D 25/162;
(Continued)

(56) References Cited

U.S. PATENT DOCUMENTS 5,104,286 A   4/1992   Donlan
5,346,365 A   9/1994   Matyscak
(Continued)

FOREIGN PATENT DOCUMENTS

CN   103109045   5/2013
CN   103459781   12/2013
(Continued)

OTHER PUBLICATIONS

International Preliminary Report on Patentability and Written Opinion of the International Searching Authority dated Apr. 28, 2015 in International (PCT) Application No. PCT/JP2015/053007.
(Continued)

*Primary Examiner* — Mark A Laurenzi
*Assistant Examiner* — Loren C Edwards
(74) *Attorney, Agent, or Firm* — Wenderoth, Lind & Ponack, L.L.P.

(57) ABSTRACT

An object of the present invention is to easily remove last-stage turbine blades. Provided is an exhaust chamber inlet-side member that has an annular shape around a rotor so as to form a part of an inner diffuser at a position facing, from the axially downstream side, base ends of last-stage turbine blades disposed on the most downstream side in the axial direction, and that is divided in the circumferential (Continued)

direction and provided so as to be detachable from the inner diffuser. When the exhaust chamber inlet-side member is dismounted from the inner diffuser, a space on the axially downstream side from the last-stage turbine blades is cleared.

13 Claims, 13 Drawing Sheets

(51) Int. Cl.
    *F01D 25/24*     (2006.01)
    *F01D 9/04*     (2006.01)
    *F01D 5/02*     (2006.01)
    *F01D 5/12*     (2006.01)
    *F01D 9/02*     (2006.01)
    *F02C 3/04*     (2006.01)

(52) U.S. Cl.
    CPC ............ *F01D 9/041* (2013.01); *F01D 25/162* (2013.01); *F01D 25/24* (2013.01); *F01D 25/243* (2013.01); *F02C 3/04* (2013.01); *F05D 2220/32* (2013.01); *F05D 2220/3215* (2013.01); *F05D 2230/70* (2013.01); *F05D 2240/35* (2013.01); *F05D 2240/60* (2013.01)

(58) Field of Classification Search
    CPC ........ F01D 25/24; F01D 25/243; F01D 25/12; F02C 3/04; F05D 2220/32; F05D 2220/3215; F05D 2230/70; F05D 2240/35; F05D 2240/60
    USPC .......................................................... 60/805
    See application file for complete search history.

(56) References Cited

U.S. PATENT DOCUMENTS

| | | |
|---|---|---|
| 2005/0050898 A1 | 3/2005 | Noda |
| 2011/0020116 A1* | 1/2011 | Hashimoto ............ F01D 9/065 |
| | | 415/180 |
| 2013/0064647 A1 | 3/2013 | Hashimoto |
| 2013/0149107 A1 | 6/2013 | Munshi et al. |
| 2013/0224011 A1 | 8/2013 | Hashimoto |

FOREIGN PATENT DOCUMENTS

| | | |
|---|---|---|
| EP | 1 512 844 | 3/2005 |
| JP | 2005-83199 | 3/2005 |
| JP | 2013-57302 | 3/2013 |
| WO | 2013/035391 | 3/2013 |
| WO | 2013/128683 | 9/2013 |

OTHER PUBLICATIONS

First Office Action dated Jan. 3, 2017 in corresponding Chinese Application No. 201580008663.0, with English translation.
International Search Report dated Apr. 28, 2015 in International (PCT) Application No. PCT/JP2015/053007.

* cited by examiner

BLADE REMOVAL DIRECTION

EXHAUST CHAMBER INLET-SIDE MEMBER, EXHAUST CHAMBER, GAS TURBINE, AND LAST-STAGE TURBINE BLADE REMOVAL METHOD

TECHNICAL FIELD

The present invention relates to an exhaust chamber inlet-side member of a gas turbine, an exhaust chamber of a gas turbine, a gas turbine, and a method of removing last-stage turbine blades of a gas turbine.

BACKGROUND ART

A gas turbine is composed of a compressor, a combustor, and a turbine. The compressor compresses air taken in through an air inlet to produce high-temperature, high-pressure compressed air. The combustor supplies fuel to the compressed air and combusts the mixture to produce high-temperature, high-pressure combustion gas. The turbine has a plurality of turbine vanes and turbine blades alternately installed in a passage inside a casing, and drives a rotor (rotating shaft) coupled to a generator to rotate as the turbine blades are driven by the combustion gas supplied to the passage. The combustion gas having driven the turbine is discharged as exhaust gas from an exhaust chamber into the atmosphere.

In the related art, for example, the gas turbine described in Patent Literature 1 shows a cooling structure of an exhaust chamber. The exhaust chamber is disposed, relative to the last-stage turbine blades of the gas turbine, on the downstream side in the combustion gas flow direction and the axial direction of the rotating shaft, and includes a casing wall and struts. The casing wall has a cylindrical shape so as to form the external shape of the exhaust chamber. The plurality of struts are disposed in the circumferential direction on the radially inner side of the casing wall, and connected to a bearing cover that houses a bearing supporting the rotating shaft. The exhaust chamber is further provided with a cylindrical outer diffuser disposed on the radially inner side of the casing wall, and a cylindrical inner diffuser disposed on the radially outer side of the bearing cover. The inlet of the outer diffuser that is located on the axially upstream side in the combustion gas flow direction is disposed so as to face the last-stage turbine blades. The inlet of the inner diffuser that is located on the axially upstream side is disposed so as to face the base ends (blade roots) of the last-stage turbine blades. The outer diffuser and the inner diffuser are penetrated by the struts, and the corresponding through-holes of the diffusers are connected to each other through strut covers that cover the outer peripheries of the struts.

CITATION LIST

Patent Literature

Patent Literature 1: Japanese Patent Laid-Open No. 2013-57302

SUMMARY OF INVENTION

Technical Problem

In the gas turbine shown in Patent Literature 1, the last-stage turbine blades located on the most downstream side in the axial direction have a structure in which each turbine blade includes a tip shroud at the leading end and the tip shrouds of the turbine blades adjacent to each other in the circumferential direction are engaged with each other to suppress blade vibration. The turbine blades are mounted with their base ends inserted into a turbine disc from the axially downstream side toward the axially upstream side. Removing the last-stage turbine blades from the turbine involves widening the clearance between the blades adjacent to each other in the circumferential direction and moving the blades toward the axially downstream side to dismount the turbine blades one by one from the turbine disc. However, in the exhaust chamber located on the axially downstream side from the last-stage turbine blades, the inner diffuser is disposed so as to face the base ends of the last-stage turbine blades from the axially downstream side, and the axial space between the last-stage turbine blades and the inner diffuser is not large. Therefore, the inner diffuser is provided with a single cutout in the circumferential direction at the axially upstream-side end, and this cutout is used to pull out the last-stage turbine blades toward the axially downstream side and dismount the blades one by one.

In recent years, depending on the shape of the tip shroud of the last-stage turbine blades, it may be difficult to dismount the last-stage turbine blades from the turbine disc by moving the blades one by one as described above. In such cases, it is necessary to move all the last-stage turbine blades a little in the circumferential direction and the axial direction at the same time, and push out the entire last-stage turbine blades toward the axially downstream side so as to be dismounted from the turbine disc. However, as the last-stage turbine blades interfere with the upstream end of the inner diffuser, the last-stage turbine blades cannot be removed from the turbine.

Having been contrived to solve the above problem, the present invention aims to provide an exhaust chamber inlet-side member that allows easy removal of last-stage turbine blades, an exhaust chamber, a gas turbine, and a last-stage turbine blade removal method.

Solution to Problem

To achieve the above object, there is provided an exhaust chamber inlet-side member of a first invention that is provided on an inlet side of an exhaust chamber including: a casing wall that is disposed, relative to a turbine including a plurality of turbine blades that are provided around a rotating shaft and in multiple stages in an axial direction in which the rotating shaft extends and rotate with the rotating shaft, on the downstream side adjacent to the turbine and has a cylindrical shape centered at an axis of the rotating shaft; an outer diffuser provided along an inner peripheral surface of the casing wall and having an annular shape around the rotating shaft; an annular inner diffuser which is disposed on the radially inner side of the outer diffuser and between which and the outer diffuser a combustion gas passage is formed; and a plurality of struts that are disposed in a circumferential direction between the outer diffuser and the inner diffuser, and connect the casing wall and an annular bearing cover covering a bearing of the rotating shaft to each other, the exhaust chamber being divided in the circumferential direction into an upper-half part and a lower-half part, wherein the exhaust chamber inlet-side member has an annular shape around the rotating shaft so as to form a part of the inner diffuser at a position facing, from the axially downstream side, base ends of last-stage turbine blades that are disposed on the most downstream side in the axial direction, and the exhaust chamber inlet-side member is divided in the circumferential direction and provided so as to be detachable from the inner diffuser.

According to this exhaust chamber inlet-side member, the exhaust chamber inlet-side member is dismounted from the inner diffuser to clear the space on the axially downstream side from the last-stage turbine blades. Thus, even in the case of last-stage turbine blades that are disposed with their leading ends adjacent to each other in the circumferential direction engaged with each other, all the last-stage turbine blades can be slid a little toward the axially downstream side and dismounted. As a result, the last-stage turbine blades can be easily removed from the turbine.

A second invention is the exhaust chamber inlet-side member according to the first invention, wherein the exhaust chamber inlet-side member is divided in the circumferential direction into at least an upper-half member and a lower-half member.

According to this exhaust chamber inlet-side member, the exhaust chamber inlet-side member can be dismounted since it is divided into at least the upper-half member and the lower-half member. Thus, at least the exhaust chamber inlet-side member is dismounted, so that the number of parts to be dismounted can be reduced and the work time required to remove the last-stage turbine blades can be reduced.

A third invention is the exhaust chamber inlet-side member according to the first or second invention, wherein the exhaust chamber inlet-side member is divided in the circumferential direction into a plurality of parts of a size that can pass through the combustion gas passage formed between the struts.

According to this exhaust chamber inlet-side member, the exhaust chamber inlet-side member is divided in the circumferential direction into the plurality of parts of a size that can pass through the combustion gas passage between the struts. Thus, it is possible to remove the exhaust chamber inlet-side member through the combustion gas passage from the axially downstream side of the exhaust chamber without disassembling the exhaust chamber. That is, it is possible to remove the exhaust chamber inlet-side member and the last-stage turbine blades while leaving the exhaust chamber. As a result, the number of parts to be dismounted can be further reduced, and the work time required to remove the last-stage turbine blades can be further reduced.

A fourth invention is the exhaust chamber inlet-side member according to any one of the first to third inventions, wherein the axial dimension of the exhaust chamber inlet-side member is at least larger than the axial dimension of a blade root of the last-stage turbine blade.

According to this exhaust chamber inlet-side member, when the exhaust chamber inlet-side member is dismounted from the inner diffuser to clear the space on the axially downstream side from the last-stage turbine blades, a space in which the last-stage turbine blades are slid toward the axially downstream side can be secured, so that the last-stage turbine blades can be reliably removed.

A fifth invention is the exhaust chamber inlet-side member according to any one of the first to fourth inventions, including: axial fastening means that is located on the radially inner side and fastens the exhaust chamber inlet-side member to the inner diffuser in the axial direction; circumferential fastening means that is located on the radially inner side and fastens together in the circumferential direction divided members of the exhaust chamber inlet-side member divided in the circumferential direction; and openings that are formed so as to lead to the respective fastening means from the radially outer side.

According to this exhaust chamber inlet-side member, the axial fastening means and the circumferential fastening means are disposed on the radially inner side, and to dismount the exhaust chamber inlet-side member, the respective fastening means is manipulated through the openings from the radially outer side. Thus, no member protrudes toward the combustion gas passage between the outer diffuser and the inner diffuser, so that adverse effects on the combustion gas flow during turbine operation can be prevented.

A sixth invention is the exhaust chamber inlet-side member according to any one of the first to fifth inventions, including: a collar which is formed at an axially downstream-side end in an annular shape so as to protrude radially inward and on which axial fastening means is mounted; and cutouts that are provided at a radially inner peripheral end of the collar at positions corresponding to circumferential positions of the struts.

According to this exhaust chamber inlet-side member, a flow of cooling air flowing through the inside of the strut covers is discharged to the combustion gas passage without being disturbed by the exhaust chamber inlet-side member, so that adverse effects on the combustion gas flow during turbine operation can be prevented.

A seventh invention is the exhaust chamber inlet-side member according to any one of the first to sixth inventions, including an adjusting plate that is provided on the axially upstream side so as to protrude radially inward and has a plurality of open holes arrayed in the circumferential direction.

According to this exhaust chamber inlet-side member, the open holes of the adjusting plate allow the cooling air flowing through the inside of the strut covers to form a uniform flow in the circumferential direction before being discharged to the combustion gas passage, so that the combustion gas flow is not disturbed.

An eighth invention is the exhaust chamber inlet-side member according to the seventh invention, further including a sealing part that is provided at a protruding end of the adjusting plate and seals a space on the radially inner side.

According to this exhaust chamber inlet-side member, the sealing part prevents the combustion gas flowing through the combustion gas passage from partially entering the bearing side, so that effects of the combustion gas on the bearing can be prevented.

To achieve the above object, there is provided an exhaust chamber of a ninth invention including: a casing wall that is disposed, relative to a turbine including a plurality of turbine blades that are provided around a rotating shaft and in multiple stages in an axial direction in which the rotating shaft extends and rotate with the rotating shaft, on the downstream side adjacent to the turbine and has a cylindrical shape centered at an axis of the rotating shaft; an outer diffuser provided along an inner peripheral surface of the casing wall and having an annular shape around the rotating shaft; an annular inner diffuser which is disposed on the radially inner side of the outer diffuser and between which and the outer diffuser a combustion gas passage is formed; a plurality of struts that are disposed in a circumferential direction between the outer diffuser and the inner diffuser, and connect the casing wall and an annular bearing cover covering a bearing of the rotating shaft to each other; and the exhaust chamber inlet-side member according to any one of the first to eighth inventions.

According to this exhaust chamber, the exhaust chamber inlet-side member is dismounted from the inner diffuser to clear the space on the axially downstream side from the last-stage turbine blades. Thus, even in the case of last-stage turbine blades that are disposed with their leading ends adjacent to each other in the circumferential direction engaged with each other, all the last-stage turbine blades can be dismounted. As a result, the last-stage turbine blades can be easily removed from the turbine.

To achieve the above object, there is provided a gas turbine of a tenth invention that combusts compressed air, compressed in a compressor, with fuel supplied thereto in a combustor, sends the generated combustion gas to a turbine to obtain rotary power of a rotating shaft, and discharges the combustion gas reaching the downstream side of the turbine from an exhaust chamber, wherein the exhaust chamber according to the ninth invention is applied.

According to this gas turbine, the exhaust chamber inlet-side member is dismounted from the inner diffuser to clear the space on the axially downstream side from the last-stage turbine blades. Thus, even in the case of last-stage turbine blades that are disposed with their leading ends adjacent to each other in the circumferential direction engaged with each other, all the last-stage turbine blades can be dismounted toward the axially downstream side. As a result, the last-stage turbine blades can be easily removed or mounted in a short time. Accordingly, the work time required to periodically inspect the last-stage turbine blades can be reduced, and the downtime of the gas turbine can be reduced.

To achieve the above object, there is provided a last-stage turbine blade removal method of an eleventh invention of removing last-stage turbine blades that are disposed on the most downstream side in an axial direction in a gas turbine provided with an exhaust chamber including: a casing wall that is disposed, relative to a turbine including a plurality of turbine blades that are provided around a rotating shaft and in multiple stages in the axial direction in which the rotating shaft extends and rotate with the rotating shaft, on the downstream side adjacent to the turbine and has a cylindrical shape centered at an axis of the rotating shaft; an outer diffuser provided along an inner peripheral surface of the casing wall and having an annular shape around the rotating shaft; an annular inner diffuser which is disposed on the radially inner side of the outer diffuser and between which and the outer diffuser a combustion gas passage is formed; and a plurality of struts that are disposed in a circumferential direction between the outer diffuser and the inner diffuser, and connect the casing wall and an annular bearing cover covering a bearing of the rotating shaft to each other, the exhaust chamber being divided in the circumferential direction into an upper-half part and a lower-half part, the method including the steps of: dismounting the upper-half part of the exhaust chamber; dismounting, from the inner diffuser in the lower-half part of the exhaust chamber, a lower-half member of an exhaust chamber inlet-side member that has an annular shape around the rotating shaft so as to form a part of the inner diffuser at a position facing base ends of the last-stage turbine blades from the axially downstream side, and that is divided in the circumferential direction into at least an upper-half member and the lower-half member; removing the lower-half member of the exhaust chamber inlet-side member from the disassembled part of the exhaust chamber; dismounting each of the last-stage turbine blades, for which a space on the axially downstream side has been cleared by dismounting the exhaust chamber inlet-side member, by sliding in the axial direction the last-stage turbine blade among all the last-stage turbine blades that is located at a predetermined circumferential position; and removing the dismounted last-stage turbine blades from the disassembled part in the upper-half part of the exhaust chamber.

According to this last-stage turbine blade removal method, the exhaust chamber inlet-side member is dismounted from the inner diffuser to clear the space on the axially downstream side from the last-stage turbine blades, so that all the last-stage turbine blades can be dismounted. Thus, the last-stage turbine blades can be easily removed from the turbine.

To achieve the above object, there is provided a last-stage turbine blade removal method of a twelfth invention of removing last-stage turbine blades that are disposed on the most downstream side in an axial direction in a gas turbine provided with an exhaust chamber including: a casing wall that is disposed, relative to a turbine including a plurality of turbine blades that are provided around a rotating shaft and in multiple stages in the axial direction in which the rotating shaft extends and rotate with the rotating shaft, on the downstream side adjacent to the turbine and has a cylindrical shape centered at an axis of the rotating shaft; an outer diffuser provided along an inner peripheral surface of the casing wall and having an annular shape around the rotating shaft; an annular inner diffuser which is disposed on the radially inner side of the outer diffuser and between which and the outer diffuser a combustion gas passage is formed; and a plurality of struts that are disposed in a circumferential direction between the outer diffuser and the inner diffuser, and connect the casing wall and an annular bearing cover covering a bearing of the rotating shaft to each other, the exhaust chamber being divided in the circumferential direction into an upper-half part and a lower-half part, the method including the steps of: dismounting, from the inner diffuser, an exhaust chamber inlet-side member that has an annular shape around the rotating shaft so as to form a part of the inner diffuser at a position facing base ends of the last-stage turbine blades from the axially downstream side, and that is divided in the circumferential direction into a plurality of parts of a size that can pass through the combustion gas passage formed between the struts; removing the exhaust chamber inlet-side member divided into the plurality of parts through the combustion gas passage between the struts; dismounting each of the last-stage turbine blades by sliding the last-stage turbine blades; and removing the dismounted last-stage turbine blades through the combustion gas passage between the struts.

According to this last-stage turbine blade removal method, the exhaust chamber inlet-side member is dismounted from the inner diffuser to clear the space on the axially downstream side from the last-stage turbine blades. Thus, even in the case of last-stage turbine blades that are disposed with their leading ends adjacent to each other in the circumferential direction engaged with each other, all the last-stage turbine blades can be slid a little toward the axially downstream side and dismounted. Moreover, according to this last-stage turbine blade removal method, it is possible to remove the dismounted last-stage turbine blades through the combustion gas passage between the struts by dismounting the exhaust chamber inlet-side member, which is divided in the circumferential direction into the plurality of parts of a size that can pass through the combustion gas passage formed between the struts, from the inner diffuser. Thus, it is possible to easily remove the last-stage turbine blades without disassembling the entire exhaust chamber.

A thirteenth invention is the last-stage turbine blade removal method according to the eleventh or twelfth invention, wherein the exhaust chamber inlet-side member has: axial fastening means that is located on the radially inner side and fastens the exhaust chamber inlet-side member to the inner diffuser in the axial direction; circumferential fastening means that is located on the radially inner side and fastens together in the circumferential direction divided members of the exhaust chamber inlet-side member divided in the circumferential direction; and openings that are formed so as to lead to the respective fastening means from the radially outer side, and wherein, in the step of dismounting the exhaust chamber inlet-side member from the inner diffuser, the respective fastening means is manipulated through the openings from the radially outer side.

According to this last-stage turbine blade removal method, the axial fastening means and the circumferential fastening means are disposed on the radially inner side, and to dismount the exhaust chamber inlet-side member, the respective fastening means is manipulated through the openings from the radially outer side. Thus, no member protrudes toward the combustion gas passage between the outer diffuser and the inner diffuser, so that adverse effects on the combustion gas flow during turbine operation can be prevented.

Advantageous Effects of Invention

According to the present invention, last-stage turbine blades can be easily removed.

DESCRIPTION OF EMBODIMENTS

In the following, embodiments according to the present invention will be described in detail on the basis of the drawings. However, the invention is not limited by these embodiments. The components in the following embodiments include other components that can be easily used as substitute by those skilled in the art or that are substantially the same.

Figure 1:
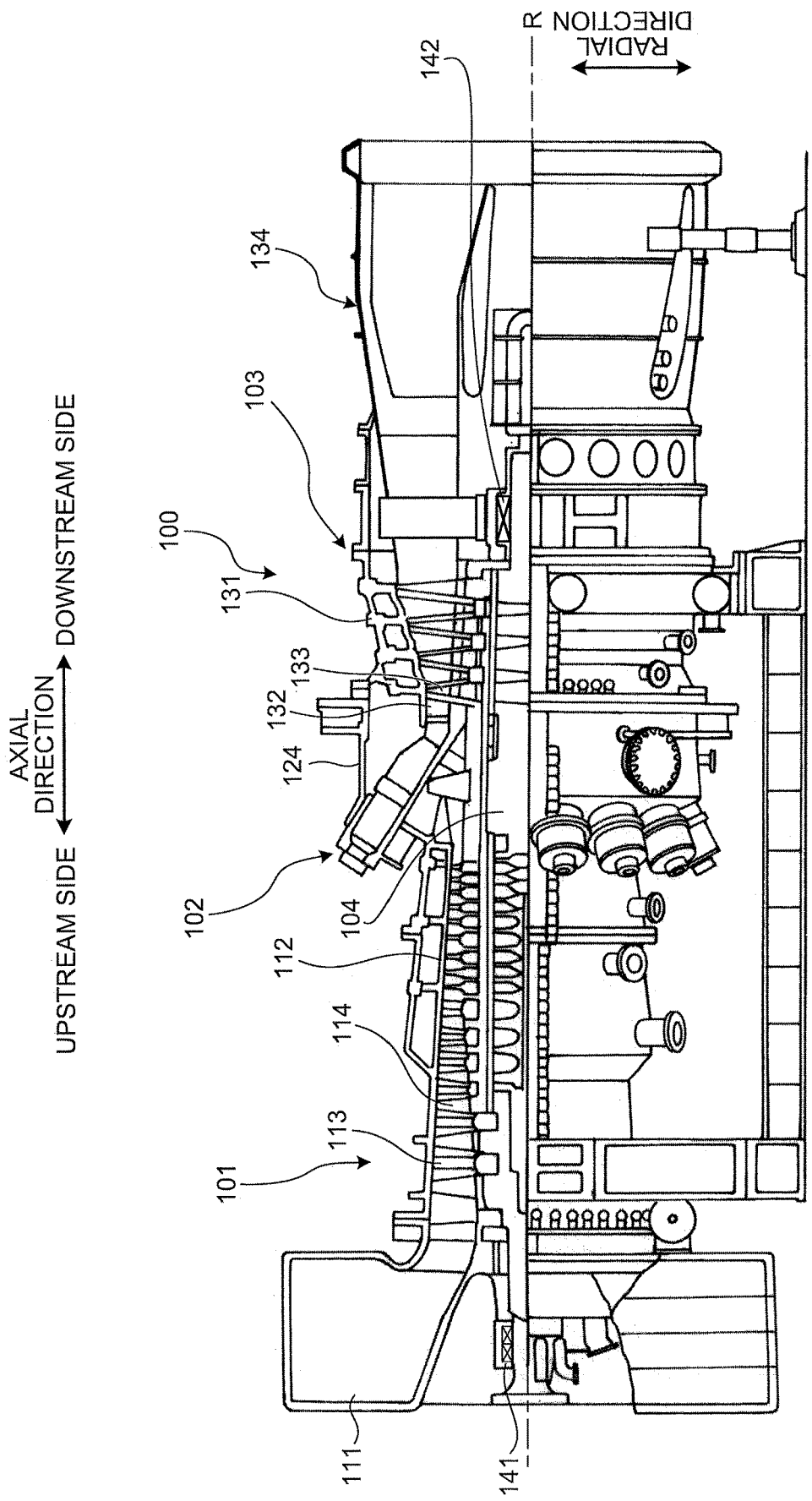
FIG. 1 is a schematic configurational view of a gas turbine according to embodiments of the present invention.

FIG. 1 is a schematic configurational view of a gas turbine according to the embodiment.

As shown in FIG. 1, a gas turbine 100 is composed of a compressor 101, combustors 102, a turbine 103, an exhaust chamber 134, and a rotor 104 being a rotating shaft. In the gas turbine 100, the compressor 101, the combustors 102, the turbine 103, and the exhaust chamber 134 are disposed in this order from the upstream side toward the downstream side in a cooling air flow direction along an axis R that is the center of the rotor 104. In the following description, the axial direction refers to a direction extending along the axis R and parallel to the axis R; the radial direction refers to a direction orthogonal to the axis R; and the circumferential direction refers to a direction centered at the axis R and orthogonal to the radial direction.

The compressor 101 compresses air to produce compressed air. The compressor 101 is provided with compressor vanes 113 and compressor blades 114 inside a compressor casing 112 that has an air inlet 111 through which air is taken in. The plurality of compressor vanes 113 are mounted on the compressor casing 112 and disposed in the circumferential direction. The plurality of compressor blades 114 are mounted on the rotor 104 and disposed in the circumferential direction. The compressor vanes 113 and the compressor blades 114 are provided alternately in the axial direction.

The combustor 102 supplies fuel to the compressed air compressed in the compressor 101 to produce high-temperature, high-pressure combustion gas. The plurality of (e.g., 16) combustors 102 are disposed on a casing 124 and disposed annularly around the rotor 104 being the rotating shaft.

The turbine 103 generates rotary power from the combustion gas produced in the combustors 102. The turbine 103 is provided with turbine vanes 132 and turbine blades 133 inside a casing 131. The plurality of turbine vanes 132 are mounted on the casing 131 and disposed in the circumferential direction. The plurality of turbine blades 133 are mounted on the rotor 104 and disposed in the circumferential direction. The turbine vanes 132 and the turbine blades 133 are provided alternately in the axial direction.

The rotor 104 is provided so as to be rotatable around the axis R, with one end on the side of the compressor 101 supported by a bearing 141 and the other end on the side of the exhaust chamber 134 supported by a bearing 142. The end of the rotor 104 on the side of the compressor 101 is coupled to a driving shaft of a generator (not shown).

In such a gas turbine 100, air taken in through the air inlet 111 of the compressor 101 is compressed into high-temperature, high-pressure compressed air by passing through the pluralities of compressor vanes 113 and compressor blades 114. The compressed air is mixed with fuel and combusted in the combustors 102, so that high-temperature, high-pressure combustion gas is produced. As the combustion gas passes through the turbine vanes 132 and the turbine blades 133 of the turbine 103, the rotor 104 is driven to rotate. The rotary power is imparted to the generator, which is coupled to the rotor 104, to generate electrical power. Then, the combustion gas having driven the rotor 104 to rotate is discharged as exhaust gas from the exhaust chamber 134 to the outside of the system.

Figure 2:
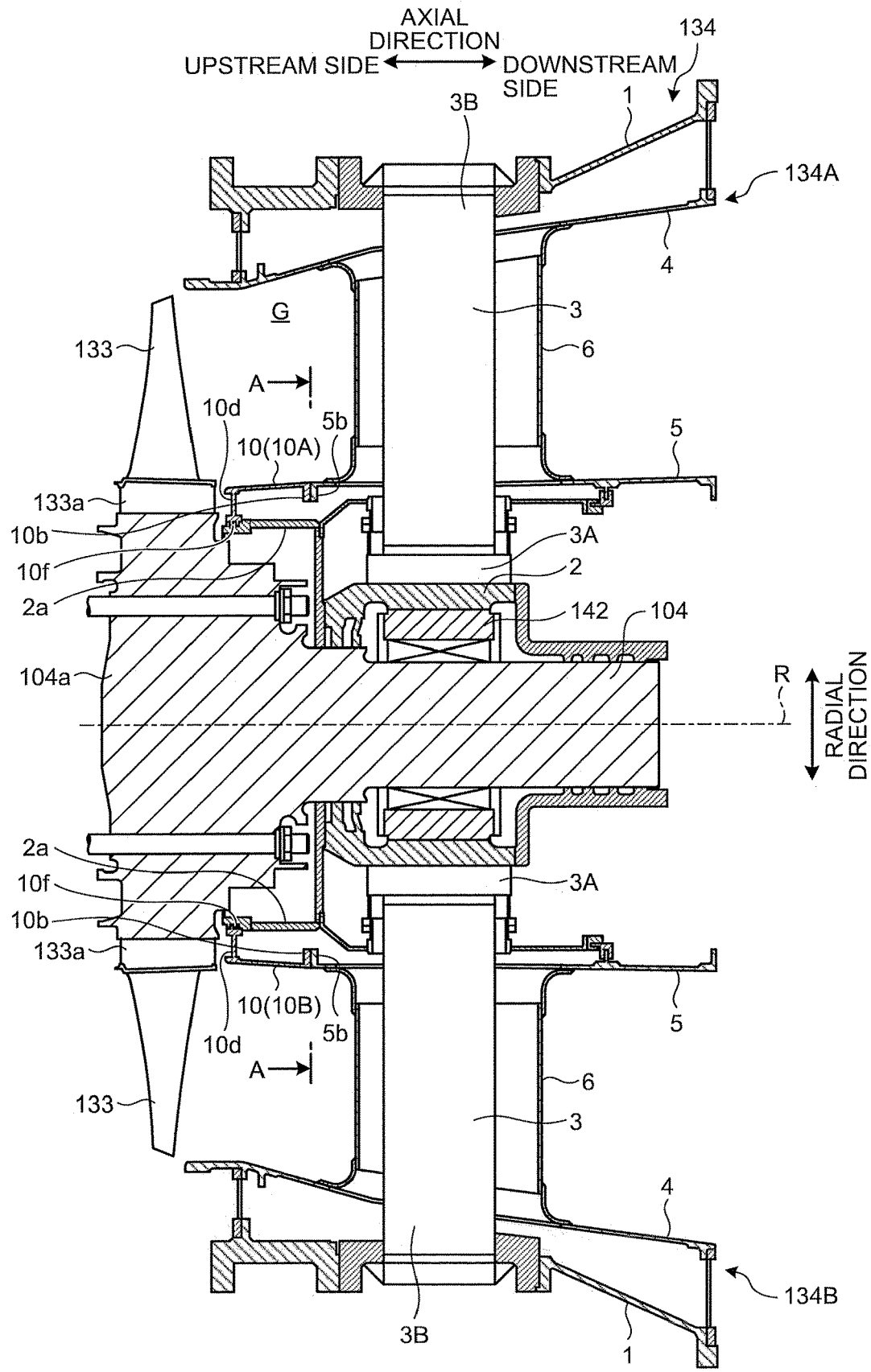
FIG. 2 is a sectional view of an exhaust chamber in the gas turbine according to the embodiments of the present invention.
Figure 3:
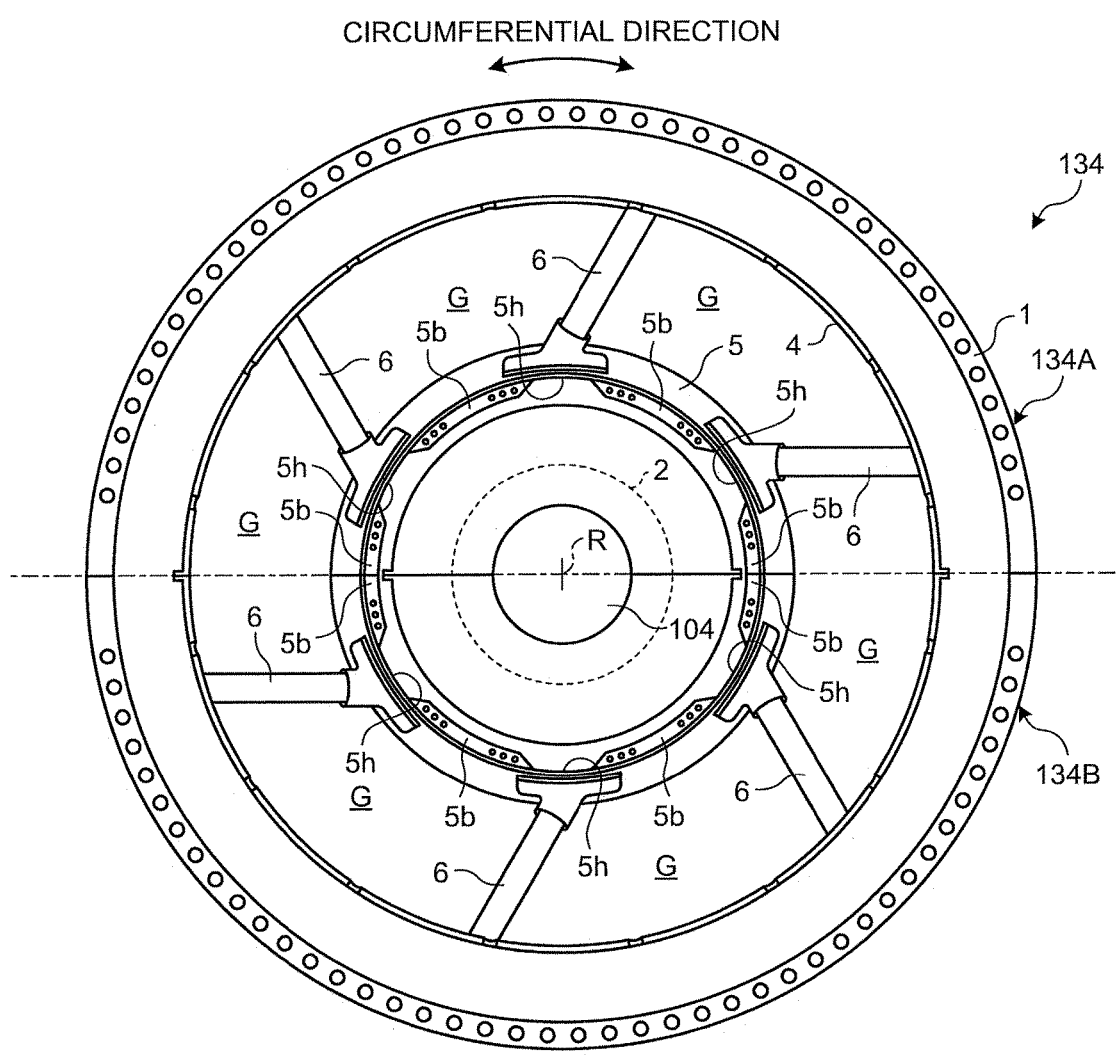
FIG. 3 is a view taken along the line A-A of FIG. 2.

FIG. 2 is a sectional view of the exhaust chamber in the gas turbine according to the embodiment, and FIG. 3 is a view taken along the line A-A of FIG. 2.

As shown in FIG. 2 and FIG. 3, the exhaust chamber 134 has a casing wall 1 that defines the external shape of the exhaust chamber 134. The exhaust chamber 134 includes a bearing cover 2 disposed on the radially inner side of the casing wall 1, and struts 3 coupling the casing wall 1 and the bearing cover 2 to each other. The exhaust chamber 134 further includes an outer diffuser 4 provided along the inner peripheral surface of the casing wall 1, an inner diffuser 5 disposed on the radially inner side of the outer diffuser 4 and provided along the outer peripheral surface of the bearing cover 2, and strut covers 6 coupling the outer diffuser 4 and the inner diffuser 5 to each other and covering the outer peripheries of the struts 3.

The casing wall 1 is a member having a cylindrical shape formed annularly around the rotor 104 with the center at the axis R, and forming the external shape of the exhaust chamber 134. The casing wall 1 is disposed on the downstream side from the casing 131 adjacent thereto in the axial direction.

The bearing cover 2 is a member disposed on the radially inner side of the casing wall 1, and having a cylindrical shape formed annularly around the rotor 104 with the center at the axis R. The bearing cover 2 houses the bearing 142 of the rotor 104 and supports the bearing 142.

The strut 3 has one end 3A connected to the outer peripheral surface of the bearing cover 2 and the other end 3B connected to the casing wall 1. That is, the casing wall 1 and the bearing cover 2 are coupled to each other through the strut 3. The strut 3 extends from the one end 3A to the other end 3B toward the radially outer side while inclining in the tangential direction around the axis R, and a plurality of (in this embodiment, six) struts 3 are provided at regular intervals in the circumferential direction.

The outer diffuser 4 is a member provided on the radially inner side of the casing wall 1 along the inner peripheral surface of the casing wall 1, and having a substantially cylindrical shape formed annularly around the rotor 104 with the center at the axis R. The outer diffuser 4 is penetrated by the struts 3.

The inner diffuser 5 is a member provided on the radially outer side of the bearing cover 2 along the outer peripheral surface of the bearing cover 2, and having a substantially cylindrical shape formed annularly around the rotor 104 with the center at the axis R. The inner diffuser 5 is penetrated by the struts 3. The cylindrical space surrounded by the inner diffuser 5 and the outer diffuser 4 forms a combustion gas passage G through which combustion gas passes, and the diffusers function to convert the dynamic pressure of the combustion gas having driven the rotor 104 to rotate into static pressure.

The strut cover 6 is a member covering the outer periphery of the strut 3, and functions to cool the strut 3 by taking in cooling air from the outside of the exhaust chamber 134 and passing the cooling air along the outer periphery of the strut 3. The cooling air having cooled the strut 3 cools internal members, including the bearing cover 2, before being discharged to the combustion gas passage G. In this embodiment, six struts 3 are disposed, each covered by the strut cover 6 and coupling the outer diffuser 4 and the inner diffuser 5 to each other. Thus, as shown in FIG. 3, the combustion gas passage G between the outer diffuser 4 and the inner diffuser 5 is also formed between the adjacent strut covers 6.

The exhaust chamber 134 thus configured is divided into two parts, an upper-half part 134A and a lower-half part 134B, at a horizontal plane based on the axis R (see FIG. 3). Relative to the last-stage turbine blades 133 that are disposed on the most downstream side in the axial direction in the turbine 103, the upstream-side end of the outer diffuser 4 faces tip shrouds at the leading ends of the last-stage turbine blades 133, while the upstream-side end of the inner diffuser 5 faces the base ends (blade roots) of the last-stage turbine blades 133. The last-stage turbine blades 133 are mounted on a turbine disc 104a in which members on the radially inner side of the base ends are formed integrally with the rotor 104. A method of dismounting and mounting the last-stage turbine blades having the tip shrouds will be described below in connection with the structure of the tip shroud.

Figure 4A:
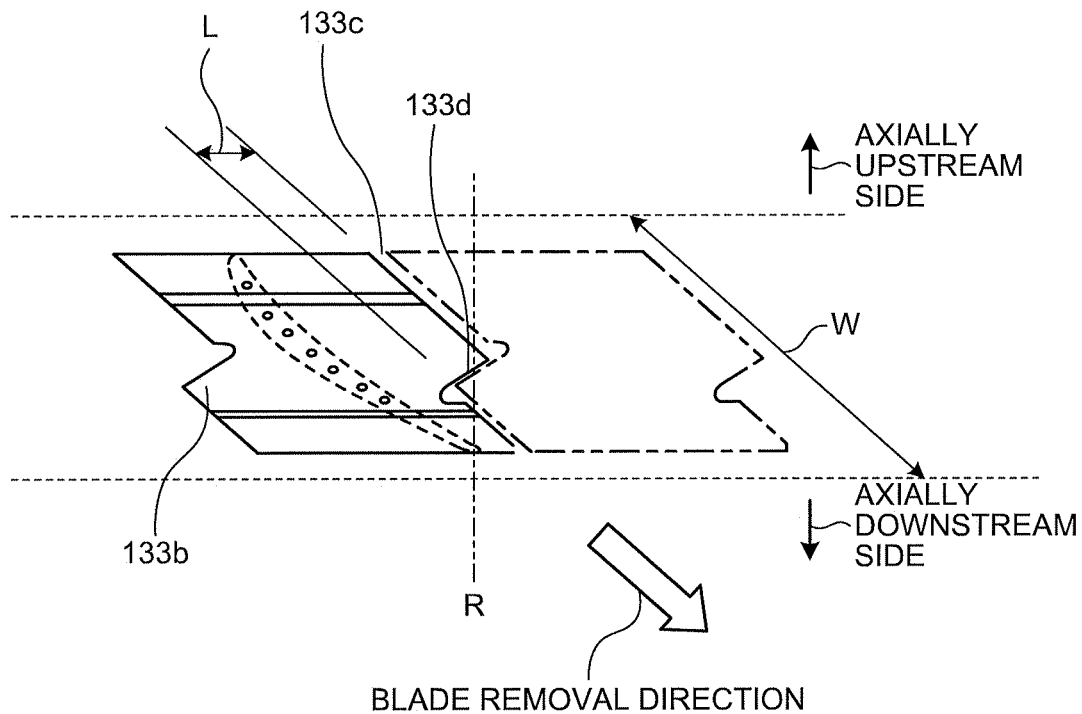
FIG. 4A is a schematic view showing tip shrouds.
Figure 4B:
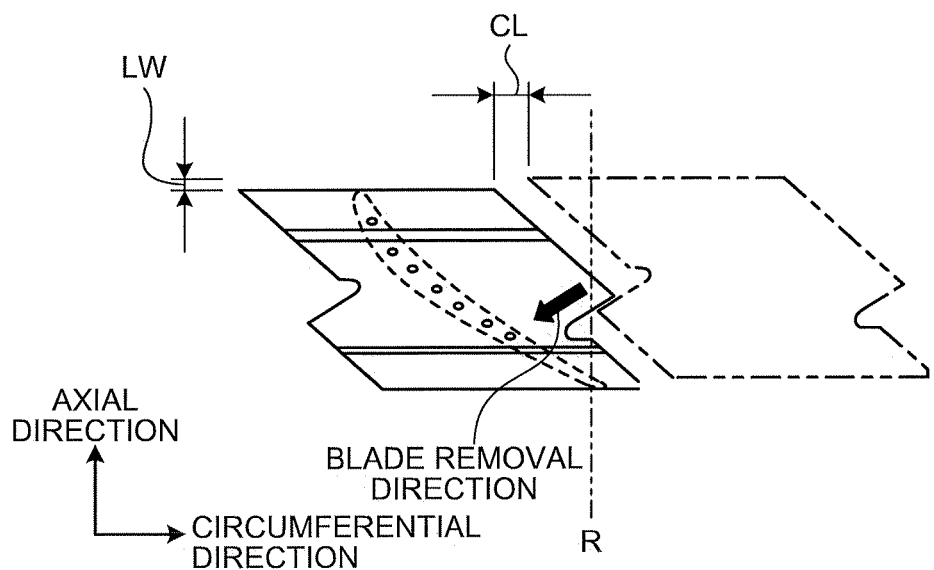
FIG. 4B is a view showing a positional relation between turbine blades.

FIG. 4A is a schematic view showing the tip shrouds in an assembled state, and FIG. 4B is a view showing a positional relation between the turbine blades in the process of dismounting the turbine blades. As shown in FIG. 4A, the turbine blades 133 adjacent to each other in the circumferential direction are mounted such that, at the leading ends of the blades, adjacent tip shrouds 133b are engaged with each other in a key-like shape, with a predetermined clearance therebetween, along dividing surfaces 133c adjacent to each other in the circumferential direction. In a central part of the dividing surface 133c in the axial direction, a contact surface 133d on which the tip shroud 133b comes into contact with another tip shroud 133b is formed at an angle relative to the axial direction.

As shown in FIG. 4A, depending on the last-stage turbine blade 133, a contact surface circumferential length L larger than a maximum circumferential clearance CL may be provided to maintain a contact length of the contact surface 133d. The maximum circumferential clearance CL refers to a maximum clearance formed between the dividing surfaces 133c of the adjacent tip shrouds 133b when the base ends (blade roots 133a) of adjacent blades are moved a slight distance, corresponding to the clearance between the blade roots 133a, in directions away from each other in the circumferential direction. In the case of such blades, as shown in FIG. 4B, even if the maximum circumferential clearance CL can be maintained by adjusting the clearance between the blade roots 133a, it is not always possible to pull out the blades in the blade removal direction due to interference between the adjacent tip shrouds 133b at a part of the contact surfaces 133d. The blade removal direction is at a certain angle relative to the axial direction of the rotor 104.

In such cases, relative to a reference last-stage turbine blade 133, a predetermined turbine blade 133 is moved along the contact surface 133d in a direction away from the reference blade in the circumferential direction. As a result of this operation, the predetermined turbine blade 133 is moved a distance corresponding to the maximum clearance CL in the circumferential direction and moved an axial movement distance LW toward the axially downstream side. It is possible to remove the turbine blades 133 from the base ends (blade roots 133a) by moving the adjacent turbine blades 133 one after another by the same operation and moving the turbine blades 133 disposed along the entire circumference. That is, if the turbine blades 133 are moved one after another until the accumulated length of the axial movement distances LW of the turbine blades 133 exceeds a blade root axial width W (axial dimension), the turbine blades 133, which can be moved toward the axially downstream side beyond the blade root axial width W, can be dismounted from the base ends (blade roots 133a) of the last-stage turbine blades. Accordingly, as far as the last-stage turbine blades 133 disposed in the circumferential direction are concerned, it is possible to remove all the last-stage turbine blades 133, if the accumulated length of the axial movement distances LW of the last-stage turbine blade 133 that is adjacent to the reference blade after one turn around the circumference from the reference blade exceeds the blade root axial width W (axial dimension). That is, it is possible to remove the blades by moving each turbine blade 133 a little in the axial direction and the circumferential direction along the contact surface 133d and moving the entire turbine blades 133 so as to be pushed out toward the axially downstream side. The operation of thus moving the turbine blades 133 in the circumferential direction and the axial direction along the contact surfaces 133d of the tip shrouds 133b will be referred to as sliding.

When sliding each turbine blade, the rotor (rotating shaft) 104 may be turned to move the last-stage turbine blade to a predetermined position (e.g., the highest position in the circumferential direction) so that the turbine blade is slid at the predetermined position.

Embodiment 1

In this embodiment, an exhaust chamber inlet-side member used for dismounting the last-stage turbine blades 133 from the turbine disc 104a, the exhaust chamber, the gas turbine, and a method of dismounting and removing the last-stage turbine blades will be described.

Figure 5:
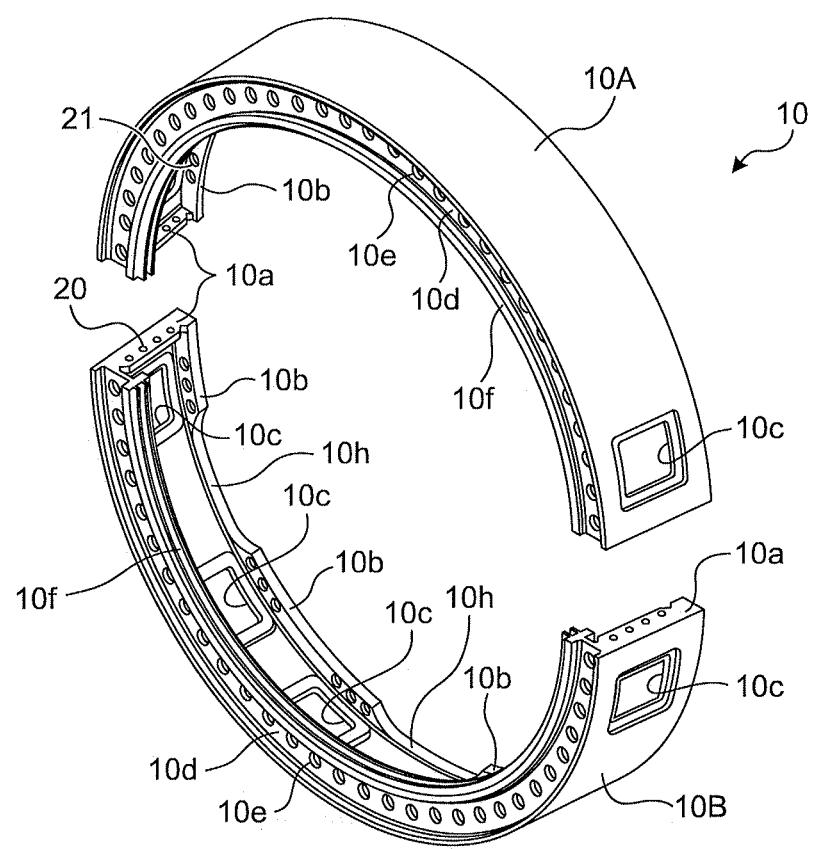
FIG. 5 is a perspective view of an exhaust chamber inlet-side member in the gas turbine according to Embodiment 1 of the present invention.

First, the exhaust chamber inlet-side member of this embodiment will be described. FIG. 5 is a perspective view of the exhaust chamber inlet-side member in the gas turbine according to the embodiment.

As shown in FIG. 2, an exhaust chamber inlet-side member 10 is provided as an upstream-side end of the inner diffuser 5, and is configured to be detachable from the inner diffuser 5. In this embodiment, the exhaust chamber inlet-side member 10 is a member having a cylindrical shape formed annularly around the rotor 104 with the center at the axis R. The exhaust chamber inlet-side member 10 is a part that serves as an inlet of a combustion gas (exhaust gas) flow in the exhaust chamber 134 as well as serves as an outlet of a combustion gas flow from the turbine 103, and since the exhaust chamber inlet-side member 10 has an annular shape, it is also called an inlet ring. The axial dimension (width) of the exhaust chamber inlet-side member 10 is larger than the axial dimension of the blade root 133a of the last-stage turbine blade 133.

The exhaust chamber 134 has an annular shape based on the axis R of the rotor (rotating shaft) 104, and is divided at a horizontal plane into two parts, the upper-half part 134A and the lower-half part 134B (see FIG. 2 and FIG. 3). As shown in FIG. 5, the exhaust chamber inlet-side member 10 also has an annular shape based on the axis R of the rotor (rotating shaft) 104, and is divided at a horizontal plane into two parts, an upper-half member 10A and a lower-half member 10B.

As shown in FIG. 5, the upper-half member 10A and the lower-half member 10B are fastened together by circumferential fastening means 20 at their divided parts. The circumferential fastening means 20 is composed of bolts and nuts, of which the former penetrates in the circumferential direction ribs 10a that extend in the axial direction and protrude radially inward in the upper-half member 10A and the lower-half member 10B. The upper-half member 10A and the lower-half member 10B are coupled to each other into an annular shape, with the ribs 10a fastened together by the circumferential fastening means (bolts and nuts) 20.

As shown in FIG. 2, FIG. 3, and FIG. 5, the upper-half member 10A and the lower-half member 10B are fastened to the inner diffuser 5 by axial fastening means 21. That is, as shown in FIG. 2 and FIG. 3, a rib (collar) 5b that extends in the circumferential direction and protrudes radially inward is provided at the axially upstream-side end of the inner diffuser 5, and a rib 10b that extends in the circumferential direction and protrudes radially inward is provided at the axially downstream-side end of the exhaust chamber inlet-side member 10 so as to face the rib 5b in the axial direction. The axial fastening means 21 is composed of bolts and nuts. The bolts penetrating in the axial direction are inserted into bolt holes bored in the ribs 5b, 10b, and the ribs 5b, 10b are fastened together by the nuts. As a result, the upper-half member 10A and the lower-half member 10B are coupled to the inner diffuser 5 by the axial fastening means (bolts and nuts) 21.

As shown in FIG. 5, the upper-half member 10A and the lower-half member 10B each have openings 10c so that the circumferential fastening means 20 and the axial fastening means 21 are accessible from the radially outer side. The openings 10c are closed with lid members (not shown) during operation of the gas turbine 100.

As shown in FIG. 3, at the radially inner peripheral end of the rib (collar) 5b mounted on the inner diffuser 5, cutouts 5h recessed from the radially inner peripheral end toward the radially outer side are formed in the circumferential directions of the rib 5b at positions corresponding to the circumferential positions of the struts 3. As shown in FIG. 5, cutouts 10h that extend in the circumferential direction at the radially inner peripheral end are formed in the rib 10b, which is adjacent to the rib 5b from the axially upstream side, at positions corresponding to the circumferential positions of the cutouts 5h. When the rib 5b and the rib 10b are fastened together by the axial fastening means 21, the cutouts 5h and the cutouts 10h form cutouts of almost the same size penetrating in the axial direction. Since the cutouts 5h and the cutouts 10h are provided at positions corresponding to the circumferential positions of the struts 3, the cooling air flowing through the inside of the strut covers 6, while flowing toward the exhaust chamber inlet-side member 10 on the axially upstream side, is not blocked by the rib 5b and the rib 10b but flows through the cutouts 5h and the cutouts 10h, so that the cooling air flow is not disturbed.

Thus, as shown in FIG. 2, the upper-half member 10A and the lower-half member 10B of the exhaust chamber inlet-side member 10 coupled to the inner diffuser 5 constitute the upstream-side end of the inner diffuser 5 as a part of the inner diffuser 5, forms the combustion gas passage G along with the outer diffuser 4, and constitutes a part of the exhaust chamber 134 of the gas turbine 100.

As shown in FIG. 2 and FIG. 5, the exhaust chamber inlet-side member 10 further has an adjusting plate 10d. The adjusting plate 10d is provided on the axially upstream side annularly around the rotor 104 so as to protrude radially inward, and has a plurality of open holes 10e arrayed in the circumferential direction. The exhaust chamber inlet-side member 10 further has a sealing part 10f. The sealing part 10f is provided at the protruding end of the adjusting plate 10d, and seals a space on the radially inner side by coming into contact with a cover member 2a that is coupled to the bearing cover 2 provided on the radially inner side of the inner diffuser 5. The adjusting plate 10d functions to reduce the amount of cooling air when the cooling air flowing on the outer peripheries of the struts 3 is discharged to the combustion gas passage G. Thus, even when the gas pressure in the combustion gas passage G varies in the circumferential direction, the amount of cooling air discharged through the open holes 10e is reduced to some extent, so that the amount of cooling air discharged into the combustion gas does not vary in the circumferential direction, and disturbance of the combustion gas flow can be prevented. The sealing part 10f prevents the combustion gas from entering the side of the bearing 142 in the inner diffuser 5.

Figure 6:
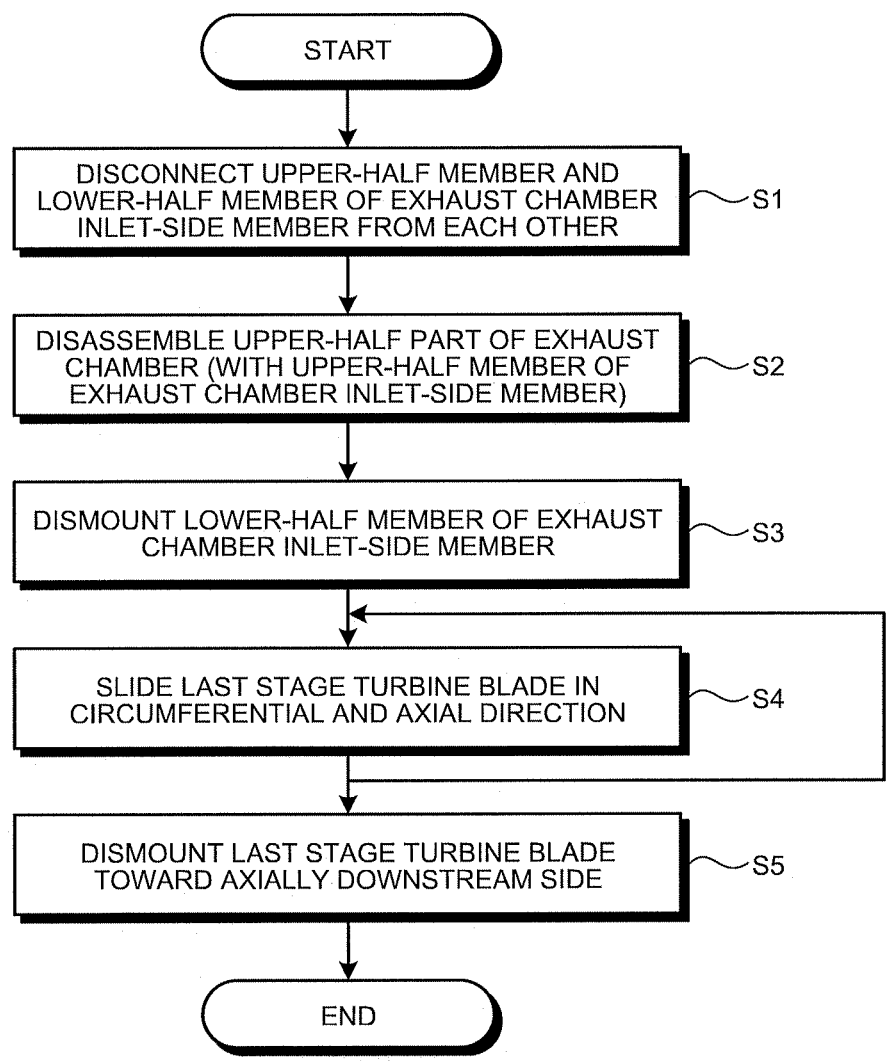
FIG. 6 is a flowchart of a method of dismounting last-stage turbine blades in the gas turbine according to Embodiment 1 of the present invention.
Figure 7:
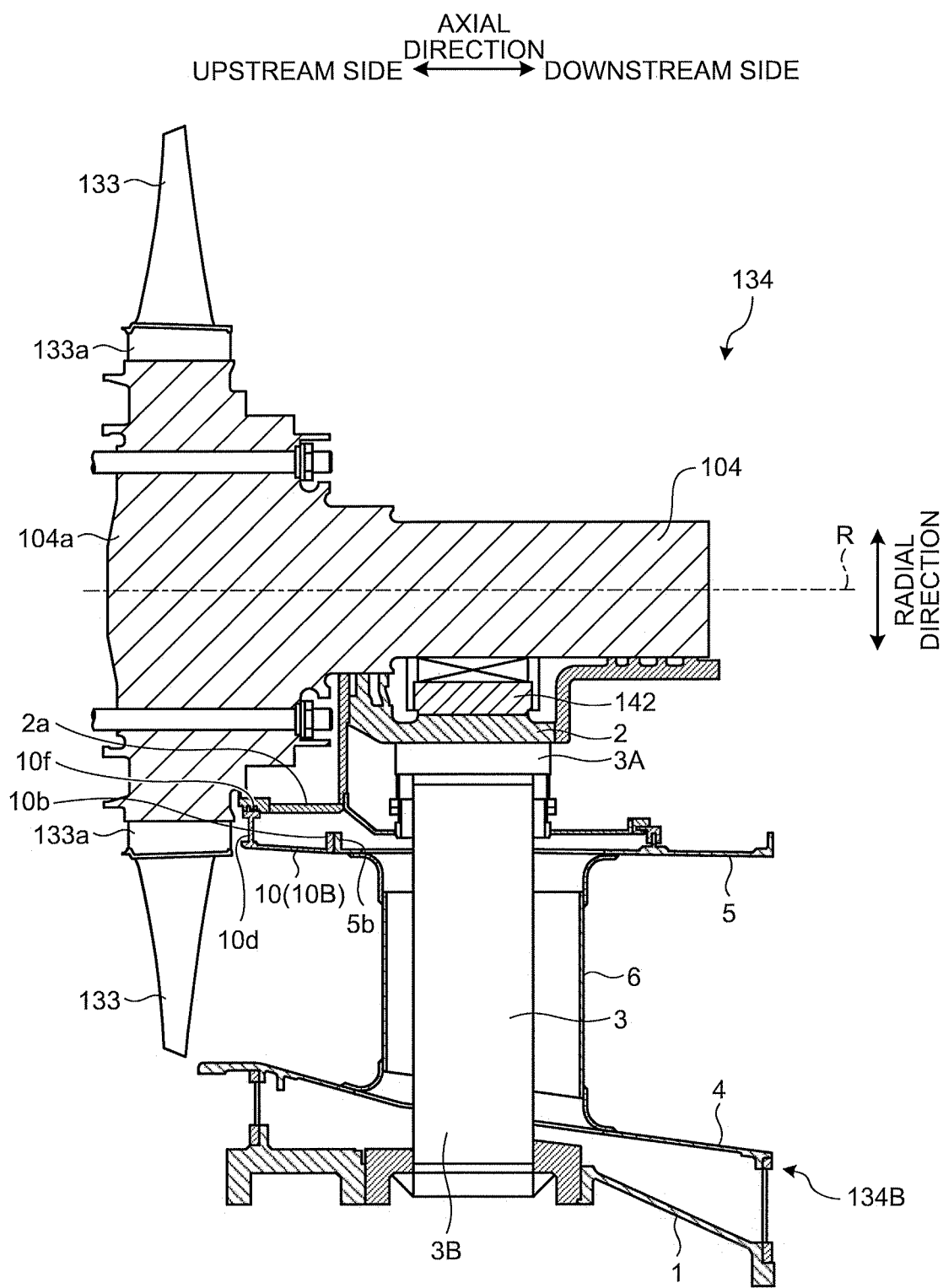
FIG. 7 is a view showing a step in the method of dismounting the last-stage turbine blades in the gas turbine according to Embodiment 1 of the present invention.
Figure 8:
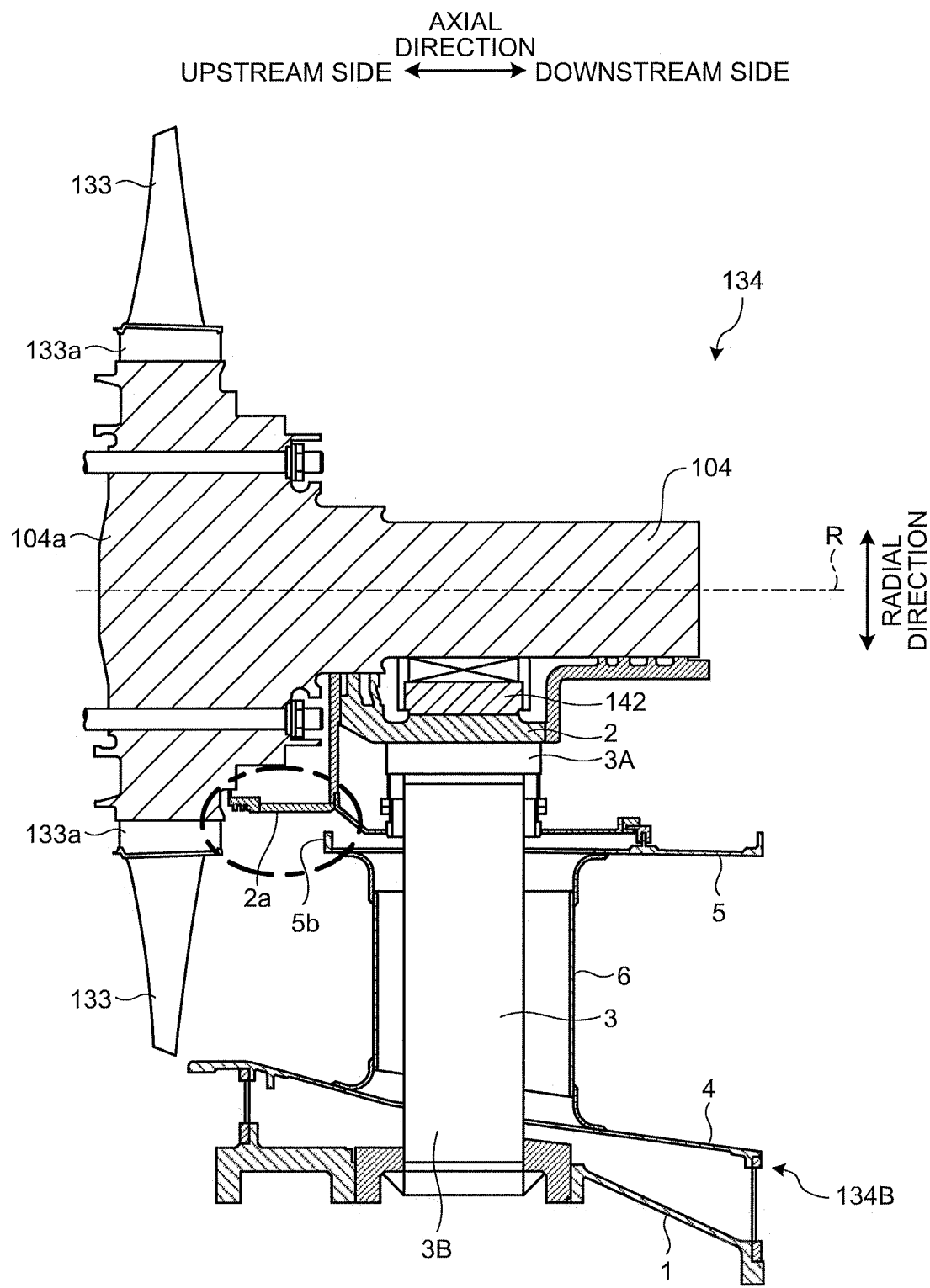
FIG. 8 is a view showing a step in the method of dismounting the last-stage turbine blades in the gas turbine according to Embodiment 1 of the present invention.
Figure 9:
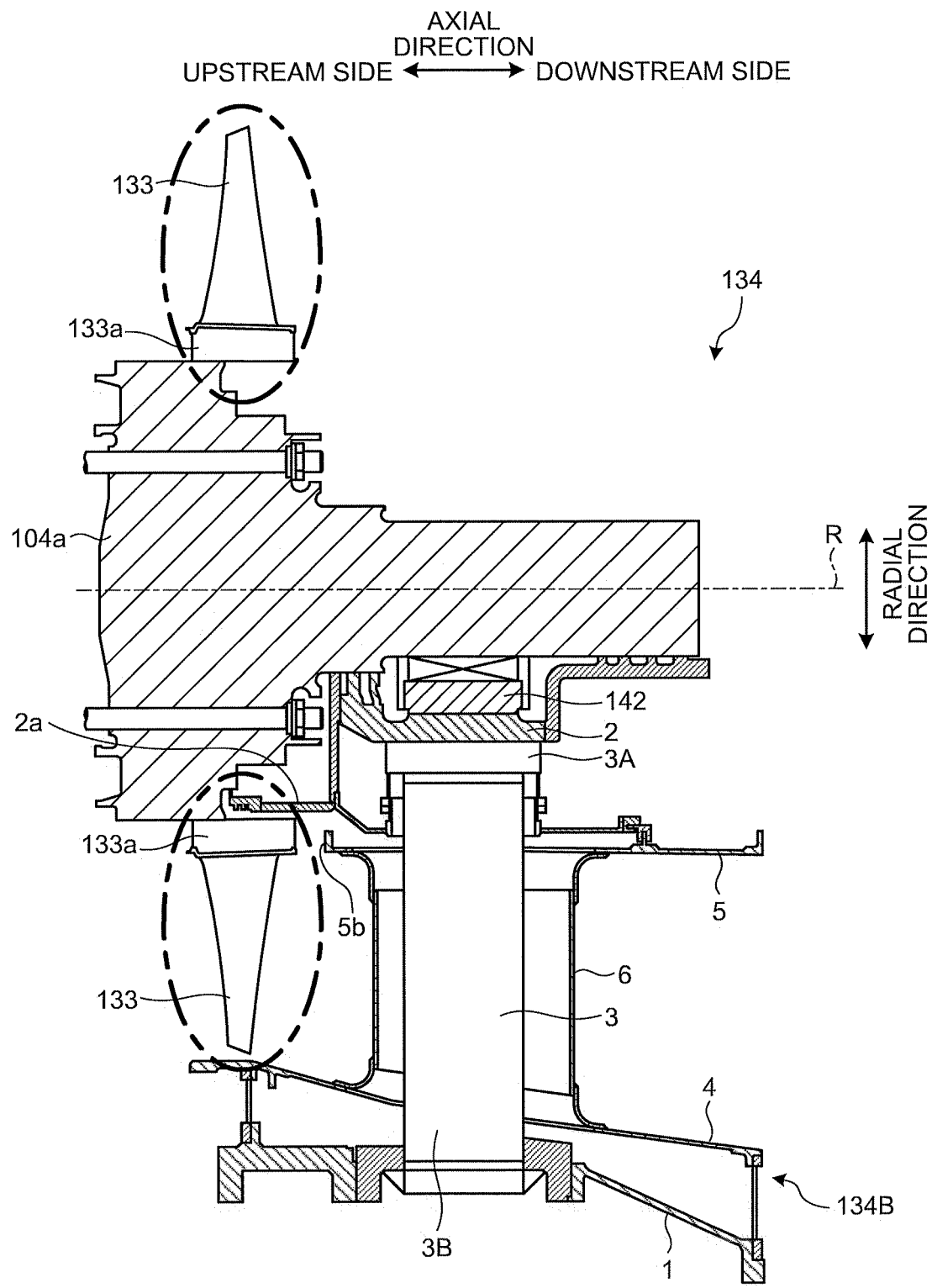
FIG. 9 is a view showing a step in the method of dismounting the last-stage turbine blades in the gas turbine according to Embodiment 1 of the present invention.

Next, the last-stage turbine blade removal method of this embodiment will be described. FIG. 6 is a flowchart of the method of dismounting the last-stage turbine blades in the gas turbine according to the embodiment. FIG. 7 to FIG. 9 are views showing steps in the method of dismounting the last-stage turbine blades in the gas turbine according to the embodiment.

In the above-described configuration, the exhaust chamber inlet-side member 10 is dismounted from the inner diffuser 5 when removing the last-stage turbine blades 133.

First, the circumferential fastening means (bolts and nuts) 20 is dismounted to disconnect the upper-half member 10A and the lower-half member 10B of the exhaust chamber inlet-side member 10 from each other (step S1).

Next, the upper-half part 134A of the exhaust chamber 134 is disconnected from the lower-half part 134B to disassemble the upper-half casing of the exhaust chamber 134 (step S2). Specifically, as shown in FIG. 2 and FIG. 7, from the upper-half part 134A of the exhaust chamber 134 in the state shown in FIG. 2, the above-described casing wall 1, outer diffuser 4, struts 3, strut covers 6, inner diffuser 5, bearing cover 2, and bearing 142 are dismounted. FIG. 7 shows a state after the upper-half casing has been disassembled. The upper-half member 10A of the exhaust chamber inlet-side member 10 may be dismounted integrally with the inner diffuser 5, or may be disconnected from the inner diffuser 5 by dismounting the bolts that are the axial fastening means 21. At this point, the lower-half casing of the exhaust chamber 134 remains installed, and the casing wall 1, the outer diffuser 4, the struts 3, the strut covers 6, the inner diffuser 5, the bearing cover 2, and the bearing 142 of the lower-half casing remain attached to the lower-half part 134B. Accordingly, the rotor 104 is rotatably supported.

Next, the axial fastening means (bolts and nuts) 21 shown in FIG. 5 that is fixing the lower-half member 10B to the inner diffuser 5 in FIG. 7 is dismounted, and as shown in FIG. 8, the lower-half member 10B of the exhaust chamber inlet-side member 10 shown in FIG. 7 is disconnected from the inner diffuser 5 and dismounted from the lower-half part 134B of the exhaust chamber 134 (step S3). The part circled by the dot-and-dash line in FIG. 8 indicates the part corresponding to step S3. The lower-half member 10B of the exhaust chamber inlet-side member 10 disconnected from the inner diffuser 5 is turned in the circumferential direction around the axis R and pulled out from the disassembled upper-half casing of the exhaust chamber 134.

Thus, the space on the downstream side from all the last-stage turbine blades 133 and the blade roots 133a of the last-stage turbine blades 133 has been cleared to an extent larger than the axial dimension of the blade root 133a, so that it is possible to slide the last-stage turbine blades 133 toward the axially downstream side along the axis R. Accordingly, as shown in FIG. 4A, FIG. 4B, and FIG. 9, all the last-stage turbine blades 133 are slid a little toward the downstream side along the axis R from the state shown in FIG. 8, and dismounted from the base ends on the turbine disc 104a (step S4). The parts circled by the dot-and-dash line in FIG. 9 indicate the parts corresponding to step S4.

Then, the last-stage turbine blades 133 are dismounted toward the axially downstream side (step S5). The last-stage turbine blades 133 having been pulled out are removed from the disassembled upper-half casing of the exhaust chamber 134.

The above steps should be performed in reverse order to mount the last-stage turbine blades 133 on the turbine disc 104a.

According to the exhaust chamber inlet-side member 10, the exhaust chamber inlet-side member 10 is dismounted from the inner diffuser 5 to clear the space on the axially downstream side from the last-stage turbine blades 133. Thus, even in the case of the last-stage turbine blades 133 that are disposed with their leading ends (tip shrouds 133b) adjacent to each other in the circumferential direction engaged with each other, all the last-stage turbine blades 133 can be slid a little toward the axially downstream side and dismounted from the base ends on the turbine disc 104a. As a result, it is possible to easily remove the last-stage turbine blades 133 by dismounting only the upper-half part 134A without dismounting the entire exhaust chamber 134.

The exhaust chamber inlet-side member 10 of this embodiment is divided in the circumferential direction into at least the upper-half member 10A and the lower-half member 10B for easy disassembly and assembly.

According to the exhaust chamber inlet-side member 10, it is possible to dismount the upper-half member 10A integrally with the upper-half part 134A of the exhaust chamber 134 when dismounting the upper-half part 134A. Thus, the upper-half member 10A of the exhaust chamber inlet-side member 10 can be dismounted along with the upper-half part 134A of the exhaust chamber 134, and the lower-half member 10B of the exhaust chamber inlet-side member 10 can be dismounted from the remaining lower-half part 134B of the exhaust chamber 134. Accordingly, the number of parts to be dismounted can be reduced, and the work time required to remove the last-stage turbine blades 133 can be reduced.

The axial width of the exhaust chamber inlet-side member 10 of this embodiment is at least larger than the axial dimension of the blade root 133a (blade root axial width W) of the last-stage turbine blade 133.

According to the exhaust chamber inlet-side member 10, when the exhaust chamber inlet-side member 10 is dismounted from the inner diffuser 5 to clear the space on the axially downstream side from the last-stage turbine blades 133, a space in which the last-stage turbine blades 133 are slid toward the axially downstream side can be secured, so that the last-stage turbine blades 133 can be reliably removed.

The exhaust chamber inlet-side member 10 of this embodiment has the axial fastening means 21 that is located on the radially inner side of the inner diffuser 5 and fastens the exhaust chamber inlet-side member 10 to the inner diffuser 5 in the axial direction, the circumferential fastening means 20 that is located on the radially inner side and fastens together the divided members of the exhaust chamber inlet-side member 10 divided in the circumferential direction, and the openings 10c that are formed so as to lead to (allow access to) the respective fastening means from the radially outer side.

According to the exhaust chamber inlet-side member 10, the axial fastening means 21 and the circumferential fastening means 20 are disposed on the radially inner side of the inner diffuser 5, and to dismount the exhaust chamber inlet-side member 10, the respective fastening means is manipulated through the openings 10c from the radially outer side. Thus, the axial fastening means 21 and the circumferential fastening means 20 are disposed on the radially inner side of the inner diffuser 5 and there is no obstacle inside the combustion gas passage G, so that the combustion gas flow is not disturbed and adverse effects thereon during operation of the turbine 103 can be prevented.

Embodiment 2

This embodiment is intended to offer a more significant advantage of easy removal of the last-stage turbine blades 133 than Embodiment 1 described above. In this embodiment, therefore, those parts that are the same as in Embodiment 1 will be given the same reference signs and description thereof will be omitted, while only those parts that are improved from Embodiment 1 will be given new reference signs and described.

Figure 10:
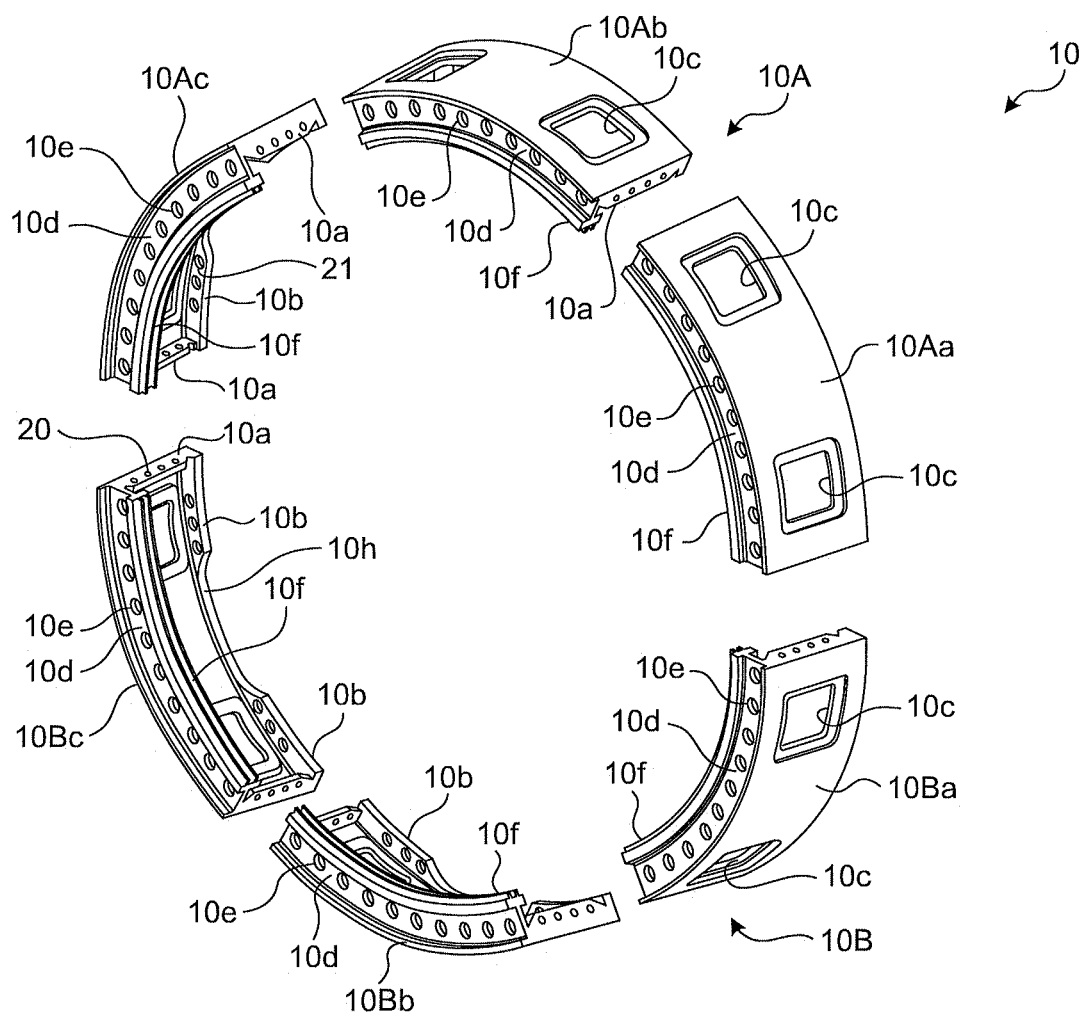
FIG. 10 is a perspective view of an exhaust chamber inlet-side member in the gas turbine according to Embodiment 2 of the present invention.

First, an exhaust chamber inlet-side member of this embodiment will be described. FIG. 10 is a perspective view of the exhaust chamber inlet-side member in the gas turbine according to the embodiment.

The exhaust chamber inlet-side member 10 has an annular shape around the rotor 104, and is divided in the circumferential direction into a plurality of parts of a size that can pass through the combustion gas passage G between the struts 3 (strut covers 6). In this embodiment, the exhaust chamber inlet-side member 10 is divided into two parts, the upper-half member 10A and the lower-half member 10B, at a horizontal plane based on the axis R of the rotating shaft, and the upper-half member 10A and the lower-half member 10B are each divided into three equal parts, so that there are six equal parts in the circumferential direction, 10Aa, 10Ab, 10Ac, 10Ba, 10Bb, 10Bc.

As shown in FIG. 10, the divided members 10Aa, 10Ab, 10Ac, 10Ba, 10Bb, 10Bc are fastened together at their divided parts by the circumferential fastening means 20. The circumferential fastening means 20 is composed of bolts and nuts, of which the former penetrates in the circumferential direction the ribs 10a that extend in the axial direction and protrude radially inward in the divided members. The divided members 10Aa, 10Ab, 10Ac, 10Ba, 10Bb, 10Bc are coupled to one another into an annular shape, with the ribs 10a fastened together by the circumferential fastening means (bolts and nuts) 20.

As shown in FIG. 2 and FIG. 10, the divided members 10Aa, 10Ab, 10Ac, 10Ba, 10Bb, 10Bc are fastened to the inner diffuser 5 by the axial fastening means 21. As shown in FIG. 2, the axial fastening means 21 is composed of bolts and nuts. The bolts penetrate in the axial direction the rib (collar) 5b that extends in the circumferential direction and protrudes radially inward on the inner diffuser 5, and the rib 10b that extends in the circumferential direction and protrudes radially inward on the exhaust chamber inlet-side member 10 so as to face the rib 5b in the axial direction. The divided members 10Aa, 10Ab, 10Ac, 10Ba, 10Bb, 10Bc are coupled to the inner diffuser 5, with the rib 5b and the rib 10b fastened together by the axial fastening means (bolts and nuts) 21. As shown in FIG. 10, the divided members 10Aa, 10Ab, 10Ac, 10Ba, 10Bb, 10Bc have the openings 10c so that the circumferential fastening means 20 and the axial fastening means 21 are accessible from the radially outer side. The openings 10c are closed with lid members (not shown) during operation of the gas turbine 100.

Thus, as shown in FIG. 2, the divided members 10Aa, 10Ab, 10Ac, 10Ba, 10Bb, 10Bc of the exhaust chamber inlet-side member 10 coupled to the inner diffuser 5 constitute the upstream-side end of the inner diffuser 5 as a part of the inner diffuser 5, form the combustion gas passage G along with the outer diffuser 4, and constitute a part of the exhaust chamber 134 of the gas turbine 100.

In the case of the exhaust chamber inlet-side member of this embodiment, too, as in Embodiment 1, the cutouts 10h are formed in the circumferential direction at the radially inner peripheral end of the rib 10b of the exhaust chamber inlet-side member 10 that is adjacent from the axially upstream side to the rib (collar) 5b provided on the axially upstream end of the inner diffuser 5. The circumferential positions of the cutouts 10h correspond to the circumferential positions of the cutouts 5h and correspond to the circumferential positions of the struts 3, which is the same as in Embodiment 1.

Figure 11:
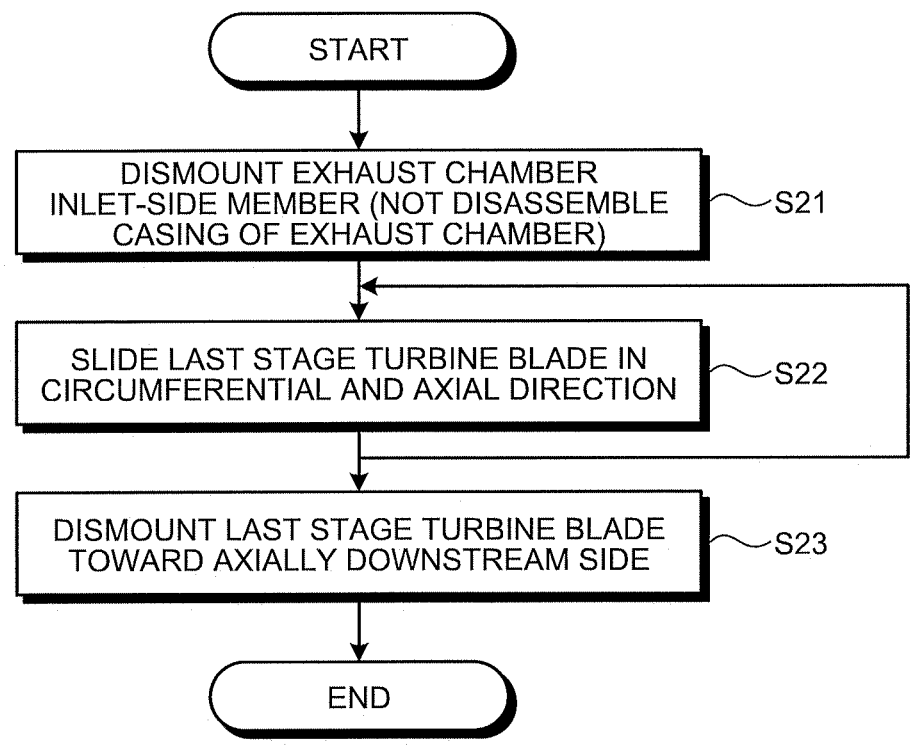
FIG. 11 is a flowchart of a method of dismounting the last-stage turbine blades in the gas turbine according to Embodiment 2 of the present invention.
Figure 12:
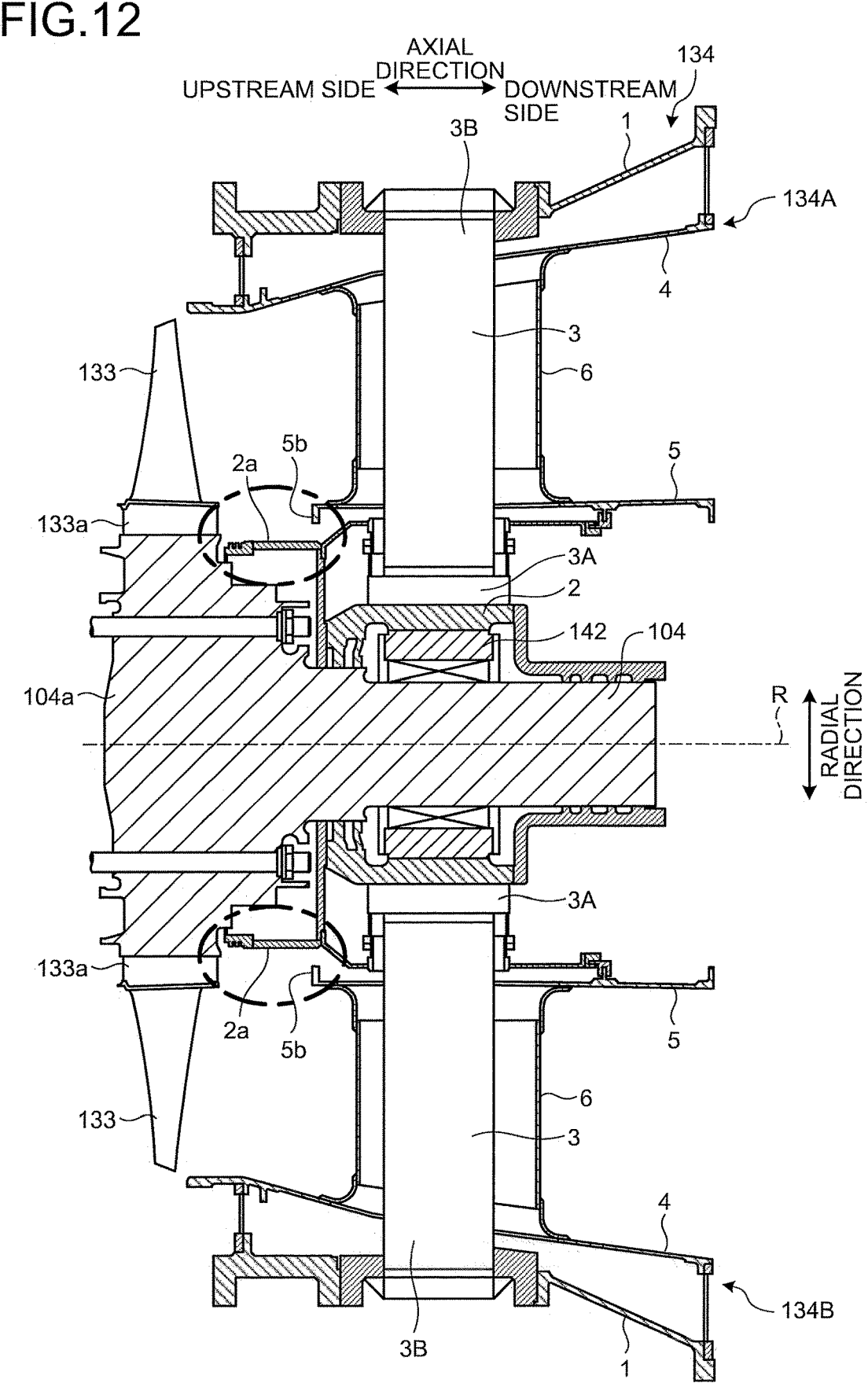
FIG. 12 a view showing a step in the method of dismounting the last-stage turbine blades in the gas turbine according to Embodiment 2 of the present invention.
Figure 13:
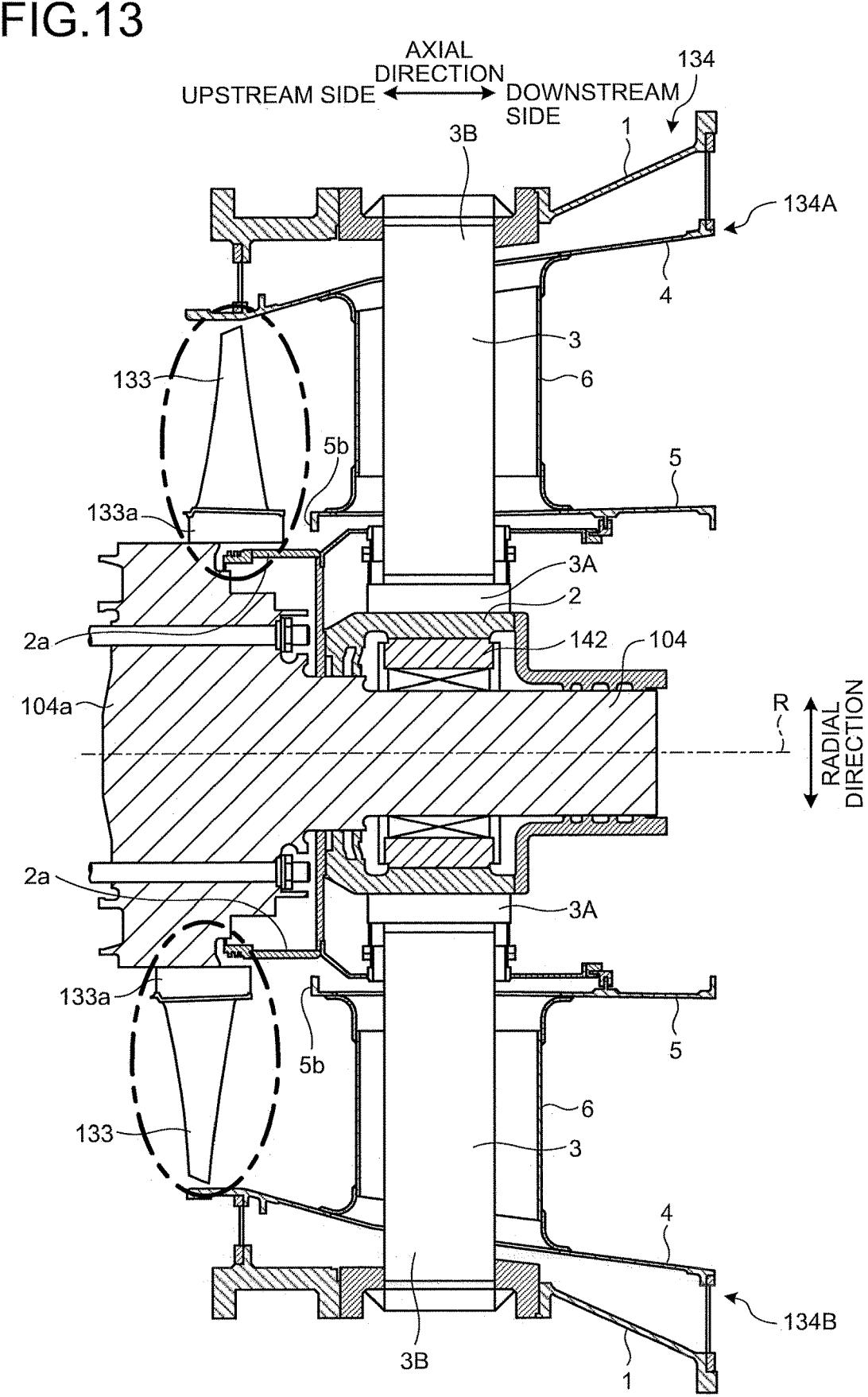
FIG. 13 a view showing a step in the method of dismounting the last-stage turbine blades in the gas turbine according to Embodiment 2 of the present invention.

Next, a last-stage turbine blade removal method in this embodiment will be described. FIG. 11 is a flowchart of a method of dismounting the last-stage turbine blades in the gas turbine according to the embodiment. FIG. 12 and FIG. 13 are views showing steps in the method of dismounting the last-stage turbine blades in the gas turbine according to the embodiment.

In the above-described configuration, the exhaust chamber inlet-side member 10 is dismounted from the inner diffuser 5 when removing the last-stage turbine blades 133.

First, as shown in FIG. 2 and FIG. 12, the circumferential fastening means (bolts and nuts) 20 and the axial fastening means (bolts and nuts) 21 are dismounted, and the divided members 10Aa, 10Ab, 10Ac, 10Ba, 10Bb, 10Bc, which are the exhaust chamber inlet-side member 10 shown in FIG. 2, are dismounted from the inner diffuser 5 and removed from the axially downstream side of the exhaust chamber 134 through the space between the struts 3 (strut covers 6) (step S21). The parts circled by the dot-and-dash line in FIG. 12 indicate the parts corresponding to step S21. In this step, the casing wall 1 constituting the casing of the exhaust chamber 134, the outer diffuser 4, the struts 3, the strut covers 6, the inner diffuser 5, the bearing cover 2, and the bearing 142 are left as they are inside the exhaust chamber 134, and the casing is not disassembled. Thus, it is possible to maintain the state in which the rotor 104 is rotatably supported.

As a result, the space on the downstream side from all the last-stage turbine blades 133 and the blade roots 133a of the last-stage turbine blades 133 has been cleared to an extent larger than the axial dimension of the blade root 133a, so that it is possible to slide the last-stage turbine blades 133 toward the downstream side along the axis R. Accordingly, as shown in FIG. 13, from the state shown in FIG. 12, all the last-stage turbine blades 133 are slid a little toward the axially downstream side along the axis R (step S22), and at least the turbine blade 133 that is adjacent to a reference blade after one turn around the circumference from the reference blade can be dismounted from the base end on the turbine disc 104a (step S23). The parts circled by the dot-and-dash line in FIG. 13 indicate the parts corresponding to step S22. In this case, as described above, the last-stage turbine blades 133 are disposed with their leading ends (tip shrouds 133b) adjacent to each other in the circumferential direction engaged with each other. However, it is possible to dismount the turbine blades 133 from the base ends by adjusting the clearance between the blade roots 133a, sliding the blades a little along the blade contact surfaces 133d of the tip shrouds 133b, and sliding the adjacent blades one after another. The last-stage turbine blades 133 having been pulled out are removed from the axially downstream side of the exhaust chamber 134 through the combustion gas passage G between the struts 3 (strut covers 6).

The above steps should be performed in reverse order to mount the last-stage turbine blades 133 on the turbine disc 104a.

According to the exhaust chamber inlet-side member 10, the exhaust chamber inlet-side member 10 is dismounted from the inner diffuser 5 to clear the space on the axially downstream side from the last-stage turbine blades 133. Thus, even in the case of the last-stage turbine blades 133 that are disposed with their leading ends (tip shrouds 133b) adjacent to each other in the circumferential direction engaged with each other, all the last-stage turbine blades 133 can be slid a little toward the axially downstream side and dismounted from the base ends on the turbine disc 104a. As a result, it is possible to easily remove the last-stage turbine blades 133 without disassembling the exhaust chamber 134.

The exhaust chamber inlet-side member 10 of this embodiment has an annular shape around the rotor (rotating shaft) 104, and is divided in the circumferential direction into the plurality of parts of such a size that can pass through the combustion gas passage G between the struts 3.

According to this exhaust chamber inlet-side member 10, the exhaust chamber inlet-side member 10 is divided in the circumferential direction of the exhaust chamber inlet-side member 10 into the plurality of parts of a size that can pass through the combustion gas passage G between the struts 3, so that it is possible to remove the exhaust chamber inlet-side member 10 from the axially downstream side of the exhaust chamber 134 through the combustion gas passage G without disassembling the exhaust chamber 134. That is, it is possible to remove the exhaust chamber inlet-side member 10 and the last-stage turbine blades 133 while leaving the exhaust chamber 134. Thus, compared with Embodiment 1, the number of parts to be dismounted can be further reduced and the work time required to remove the last-stage turbine blades 133 can be further reduced.

In the above embodiment, the example in which the upper-half member 10A and the lower-half member 10B are each divided in the circumferential direction into three parts and the exhaust chamber inlet-side member 10 as a whole is divided into six parts has been described. However, the present invention is not limited to this example. The same concept is applicable to any example in which the exhaust chamber inlet-side member 10 as a whole is divided in the circumferential direction into at least three or more parts. Except the structure of the exhaust chamber inlet-side member 10 divided into a plurality of (three or more) parts in the circumferential direction, the other structures of Embodiment 2 are the same as those of Embodiment 1, and the workings and advantages of Embodiment 2 are also the same as those of Embodiment 1.

REFERENCE SIGNS LIST

1 Casing wall
2 Bearing cover
3 Strut
4 Outer diffuser
5 Inner diffuser
5b Rib (collar)
5h Cutout
6 Strut cover
10 Exhaust chamber inlet-side member
10A Upper-half member
10B Lower-half member
10a Rib
10b Rib
10c Opening
10d Adjusting plate
10e Open hole
10f Sealing part
10h Cutout
10Aa, 10Ab, 10Ac, 10Ba, 10Bb, 10Bc Divided member
20 Circumferential fastening means
21 Axial fastening means
100 Gas turbine
101 Compressor
102 Combustor
103 Turbine
104 Rotor (rotating shaft)
133 Last-stage turbine blade
133a Blade root (base end)
133b Tip shroud
133c Dividing surface
133d Contact surface
134 Exhaust chamber
134A Upper-half part
134B Lower-half part
142 Bearing
G Combustion gas passage
R Axis

The invention claimed is:

1. A detachable inlet-side member of an exhaust chamber, the detachable inlet-side member being on an inlet side of the exhaust chamber including:
   a casing wall that is disposed, relative to a turbine including a plurality of turbine blades that are provided around a rotating shaft and in multiple stages in an axial direction in which the rotating shaft extends and rotates with the rotating shaft, on a downstream side adjacent to the turbine and has a cylindrical shape centered at an axis of the rotating shaft;
   an outer diffuser provided along an inner peripheral surface of the casing wall and having an annular shape around the rotating shaft;
   an annular inner diffuser which is disposed on a radially inner side of the outer diffuser, a combustion gas passage is formed between the annular inner diffuser and the outer diffuser; and
   a plurality of struts that are disposed in a circumferential direction between the outer diffuser and the annular inner diffuser, and connect the casing wall and an annular bearing cover, the annular bearing cover covering a bearing of the rotating shaft,
   the exhaust chamber being divided in the circumferential direction into an upper-half part and a lower-half part, wherein
   the detachable inlet-side member of the exhaust chamber is positioned in an upstream-side end of the annular inner diffuser, has a second annular shape around the rotating shaft, is divided into at least a detachable upper-half member and a detachable lower-half member in the circumferential direction, and is fastened to the upstream-side end of the annular inner diffuser by fastening means between base ends of last-stage turbine blades disposed on a most downstream side of the last-stage turbine blades in the axial direction and the struts disposed on a downstream side of the base ends of the last-stage turbine blades so as to be detachable from the annular inner diffuser in the axial direction such that the detachable inlet-side member of the exhaust chamber forms a part of the annular inner diffuser at a position facing, from an axially downstream side, the base ends of the last-stage turbine blades that are disposed on the most downstream side in the axial direction among the turbine blades.

2. The detachable inlet-side member of the exhaust chamber according to claim 1, wherein the detachable inlet-side member of the exhaust chamber is divided in the circumferential direction into a plurality of parts of a size that can pass through the combustion gas passage.

3. The detachable inlet-side member of the exhaust chamber according to claim 1, wherein an axial dimension of the detachable inlet-side member of the exhaust chamber is at least larger than an axial dimension of a blade root of the last-stage turbine blades.

4. The detachable inlet-side member of the exhaust chamber according to claim 1, comprising:
axial fastening means that are located on the radially inner side and fastens the detachable inlet-side member of the exhaust chamber to the inner diffuser in the axial direction;
circumferential fastening means that are located on the radially inner side and fastens together in the circumferential direction divided members of the detachable inlet-side member of the exhaust chamber divided in the circumferential direction; and
openings that are formed so as to lead to the axial fastening means and the circumferential fastening means from a radially outer side.

5. The detachable inlet-side member of the exhaust chamber according to claim 1, comprising:
a collar that is formed at an axially downstream-side end in an annular shape so as to protrude radially inward; and
cutouts that are provided at a radially inner peripheral end of the collar at positions corresponding to circumferential positions of the struts, and extend in the circumferential direction of the collar.

6. The detachable inlet-side member of the exhaust chamber according to claim 1, comprising an annular adjusting plate that is provided on an axially upstream side so as to protrude radially inward and has a plurality of open holes arrayed in the circumferential direction.

7. The detachable inlet-side member of the exhaust chamber according to claim 6, further comprising an annular sealing part that is provided at a protruding end of the adjusting plate and seals a space on the radially inner side.

8. An exhaust chamber comprising:
a casing wall that is disposed, relative to a turbine including a plurality of turbine blades that are provided around a rotating shaft and in multiple stages in an axial direction in which the rotating shaft extends and rotates with the rotating shaft, on a downstream side adjacent to the turbine and has a cylindrical shape centered at an axis of the rotating shaft;
an outer diffuser provided along an inner peripheral surface of the casing wall and having an annular shape around the rotating shaft;
an annular inner diffuser which is disposed on a radially inner side of the outer diffuser, a combustion gas passage is formed between the annular inner diffuser and the outer diffuser;
a plurality of struts that are disposed in a circumferential direction between the outer diffuser and the annular inner diffuser, and connect the casing wall and an annular bearing cover, the annular bearing cover covering a bearing of the rotating shaft; and the detachable inlet-side member of the exhaust chamber according to claim 1.

9. A gas turbine that combusts compressed air, compressed in a compressor, with fuel supplied thereto in a combustor, sends the generated combustion gas to a turbine to obtain rotary power of a rotating shaft, and discharges the combustion gas reaching the downstream side of the turbine from an exhaust chamber, wherein the exhaust chamber according to claim 8 is applied.

10. A last-stage turbine blade removal method of removing last-stage turbine blades that are disposed on a most downstream side in an axial direction in a gas turbine provided with an exhaust chamber including:
a casing wall that is disposed, relative to a turbine including a plurality of turbine blades that are provided around a rotating shaft and in multiple stages in the axial direction in which the rotating shaft extends and rotates with the rotating shaft, on a downstream side adjacent to the turbine and has a cylindrical shape centered at an axis of the rotating shaft;
an outer diffuser provided along an inner peripheral surface of the casing wall and having an annular shape around the rotating shaft;
an annular inner diffuser which is disposed on a radially inner side of the outer diffuser, a combustion gas passage is formed between the annular inner diffuser and the outer diffuser;
a plurality of struts that are disposed in a circumferential direction between the outer diffuser and the annular inner diffuser, and connect the casing wall and an annular bearing cover, the annular bearing cover covering a bearing of the rotating shaft; and
a detachable inlet-side member of the exhaust chamber is positioned in an upstream-side end of the annular inner diffuser, has a second annular shape around the rotating shaft, is divided into at least a detachable upper-half and a detachable lower-half in the circumferential direction, and is fastened to the upstream-side end of the annular inner diffuser by fastening means between base ends of the last-stage turbine blades disposed on the most downstream side of the last-stage turbine blades in the axial direction and the struts disposed on a downstream side of the base ends of the last-stage turbine blades so as to be detachable from the annular inner diffuser in the axial direction such that the detachable inlet-side member of the exhaust chamber forms a part of the annular inner diffuser at a position facing, from an axially downstream side, the base ends of the last-stage turbine blades disposed on the most downstream side in the axial direction among the turbine blades,
the method comprising the steps of:
dismounting an upper-half part of the exhaust chamber;
dismounting, from the annular inner diffuser in a lower-half part of the exhaust chamber, the detachable lower-half member of the detachable inlet-side member of the exhaust chamber;
removing the detachable lower-half member of the detachable inlet-side member of the exhaust chamber through a part of the exhaust chamber in which the upper-half part of the exhaust chamber has been dismounted;
dismounting each of the last-stage turbine blades, for which a space on the axially downstream side has been cleared by dismounting the detachable inlet-side member of the exhaust chamber, by sliding in the axial direction the last-stage turbine blade located at a predetermined circumferential position among all the last-stage turbine blades; and removing, through the part of the exhaust chamber in which the upper-half part of the exhaust chamber has been dismounted, the last-stage turbine blades which have been dismounted.

11. The last-stage turbine blade removal method according to claim 10, wherein the detachable inlet-side member of the exhaust chamber has: axial fastening means, as the fastening means, that are located on the radially inner side and fastens the detachable inlet-side member of the exhaust chamber to the annular inner diffuser in the axial direction; circumferential fastening means that are located on the radially inner side and fastens together in the circumferential direction divided members of the detachable inlet-side member of the exhaust chamber divided in the circumferential direction; and openings that are formed on a side wall which is provided around the axis of the rotating shaft and parallel to the axial direction so as to lead to the axial fastening means and the circumferential fastening means from a radially outer side, and are closed with lid members during operation of the gas turbine, and in the step of dismounting the detachable inlet-side member of the exhaust chamber from the annular inner diffuser, the axial fastening means and the circumferential fastening means are manipulated through the openings from the radially outer side.

12. A last-stage turbine blade removal method of removing last-stage turbine blades that are disposed on a most downstream side in an axial direction in a gas turbine provided with an exhaust chamber including:

a casing wall that is disposed, relative to a turbine including a plurality of turbine blades that are provided around a rotating shaft and in multiple stages in the axial direction in which the rotating shaft extends and rotates with the rotating shaft, on a downstream side adjacent to the turbine and has a cylindrical shape centered at an axis of the rotating shaft;

an outer diffuser provided along an inner peripheral surface of the casing wall and having an annular shape around the rotating shaft;

an annular inner diffuser which is disposed on a radially inner side of the outer diffuser, a combustion gas passage is formed between the annular inner diffuser and the outer diffuser;

a plurality of struts that are disposed in a circumferential direction between the outer diffuser and the annular inner diffuser, and connect the casing wall and an annular bearing cover, the annular bearing cover covering a bearing of the rotating shaft; and a detachable inlet-side member of the exhaust chamber is positioned in an upstream-side end of the annular inner diffuser, has a second annular shape around the rotating shaft, is divided into at least a detachable upper-half and a detachable lower-half in the circumferential direction, and is fastened to the upstream-side end of the annular inner diffuser by fastening means between base ends of the last-stage turbine blades disposed on the most downstream side of the last-stage turbine blades in the axial direction and the struts disposed on a downstream side of the base end of the last-stage turbine blades so as to be detachable from the annular inner diffuser in the axial direction such that the detachable inlet-side member of the exhaust chamber forms a part of the annular inner diffuser at a position facing, from an axially downstream side, the base ends of the last-stage turbine blades disposed on the most downstream side in the axial direction among the turbine blades, the method comprising the steps of:

dismounting, from the annular inner diffuser, the detachable inlet-side member of the exhaust chamber that is fastened to the annular inner diffuser by the fastening means in the axial direction and that is divided in the circumferential direction into a plurality of parts of a size that can pass through the combustion gas passage;

removing the detachable inlet-side member of the exhaust chamber divided into the plurality of parts through the combustion gas passage;

dismounting each of the last-stage turbine blades by sliding the last-stage turbine blades; and removing the last-stage turbine blades which have been dismounted through the combustion gas passage between the struts.

13. The last-stage turbine blade removal method according to claim 12, wherein the detachable inlet-side member of the exhaust chamber has: axial fastening means that are located on the radially inner side and fastens the detachable inlet-side member of the exhaust chamber to the annular inner diffuser in the axial direction; circumferential fastening means that are located on the radially inner side and fastens together in the circumferential direction divided members of the detachable inlet-side member of the exhaust chamber divided in the circumferential direction; and openings that are formed on a side wall which is provided around the axis of the rotating shaft and parallel to the axial direction so as to lead to the axial fastening means and the circumferential fastening means from a radially outer side, and are closed with lid members during operation of the gas turbine, and in the step of dismounting the detachable inlet-side member of the exhaust chamber from the annular inner diffuser, the axial fastening means and the circumferential fastening means are manipulated through the openings from the radially outer side.

* * * * *